(12) United States Patent
Osajima et al.

(10) Patent No.: US 10,404,880 B2
(45) Date of Patent: Sep. 3, 2019

(54) IMAGE FORMING DEVICE, IMAGE FORMING METHOD, AND NON-TRANSITORY COMPUTER-READABLE MEDIUM

(71) Applicant: FUJI XEROX CO., LTD., Tokyo (JP)

(72) Inventors: Kentaro Osajima, Kanagawa (JP); Masaru Fujii, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/708,803

(22) Filed: May 11, 2015

(65) Prior Publication Data

US 2016/0100065 A1    Apr. 7, 2016

(30) Foreign Application Priority Data

Oct. 7, 2014   (JP) ................................ 2014-206588

(51) Int. Cl.
    *H04N 1/00*    (2006.01)
    *H04N 1/32*    (2006.01)
    *G06K 15/00*   (2006.01)

(52) U.S. Cl.
    CPC ......... *H04N 1/0097* (2013.01); *G06K 15/005* (2013.01); *H04N 1/00408* (2013.01); *H04N 1/32358* (2013.01); *H04N 2201/0094* (2013.01)

(58) Field of Classification Search
    CPC .................................................. H04N 1/0097
    See application file for complete search history.

(56) References Cited

U.S. PATENT DOCUMENTS

| | | | |
|---|---|---|---|
| 8,854,664 B2 | 10/2014 | Yoshimura et al. | |
| 2008/0052761 A1* | 2/2008 | Minami | G06F 21/608 |
| | | | 726/2 |

(Continued)

FOREIGN PATENT DOCUMENTS

| | | |
|---|---|---|
| JP | 2005-039411 A | 2/2005 |
| JP | 2007-42100 A | 2/2007 |

(Continued)

OTHER PUBLICATIONS

Nov. 30, 2017 Office Action issued in Chinese Patent Application No. 201510354136.7.

(Continued)

*Primary Examiner* — King Y Poon
*Assistant Examiner* — Michael Burleson
(74) *Attorney, Agent, or Firm* — Oliff PLC

(57) ABSTRACT

An image forming device includes a search processor and a display controller. The search processor searches storage location information corresponding to storage locations storing image data. When multiple storage location information with the same identification information is found by search, the display controller causes a display unit to display representational information collectively representing the multiple storage location information, and causes the display unit to display information related to image data using a different process of displaying information related to image data stored in the multiple locations, according to whether or not attribute information used as supplementary information for identifying storage location information is associated with each of the multiple storage location information corresponding to specified representational information.

7 Claims, 19 Drawing Sheets

(56) References Cited

U.S. PATENT DOCUMENTS

| | | | | |
|---|---|---|---|---|
| 2010/0174229 A1* | 7/2010 | Hsu | ....................... | A61M 5/142 |
| | | | | 604/66 |
| 2011/0283087 A1* | 11/2011 | Watanabe | ............... | G06F 9/547 |
| | | | | 712/30 |
| 2012/0069380 A1* | 3/2012 | Sugimoto | ............. | G06F 3/1205 |
| | | | | 358/1.14 |
| 2015/0066568 A1* | 3/2015 | Rees | ................ | G06Q 10/06315 |
| | | | | 705/7.25 |

FOREIGN PATENT DOCUMENTS

| JP | 2008-158766 A | 7/2008 |
|---|---|---|
| JP | 2008-173941 A | 7/2008 |
| JP | 2013-003725 A | 1/2013 |

OTHER PUBLICATIONS

Jul. 3, 2018 Notification of Reasons of Refusal issued in Japanese Patent Application No. 2014-206588.

\* cited by examiner

IMAGE FORMING DEVICE, IMAGE FORMING METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2014-206588 filed Oct. 7, 2014.

BACKGROUND

The present invention relates to an image forming device, an image forming method, and a non-transitory computer-readable medium.

SUMMARY

According to an aspect of the invention, there is provided an image forming device that includes a search processor and a display controller. The search processor searches storage location information corresponding to storage locations storing image data. When multiple storage location information with the same identification information are found by search, the display controller causes a display unit to display representational information collectively representing the multiple storage location information, and causes the display unit to display information related to image data using a different process of displaying information related to image data stored in the multiple locations, according to whether or not attribute information used as supplementary information for identifying storage location information is associated with each of the multiple storage location information corresponding to specified representational information.

BRIEF DESCRIPTION OF THE DRAWINGS

Exemplary embodiments of the present invention will be described in detail based on the following figures, wherein.

DETAILED DESCRIPTION

Figure 1:
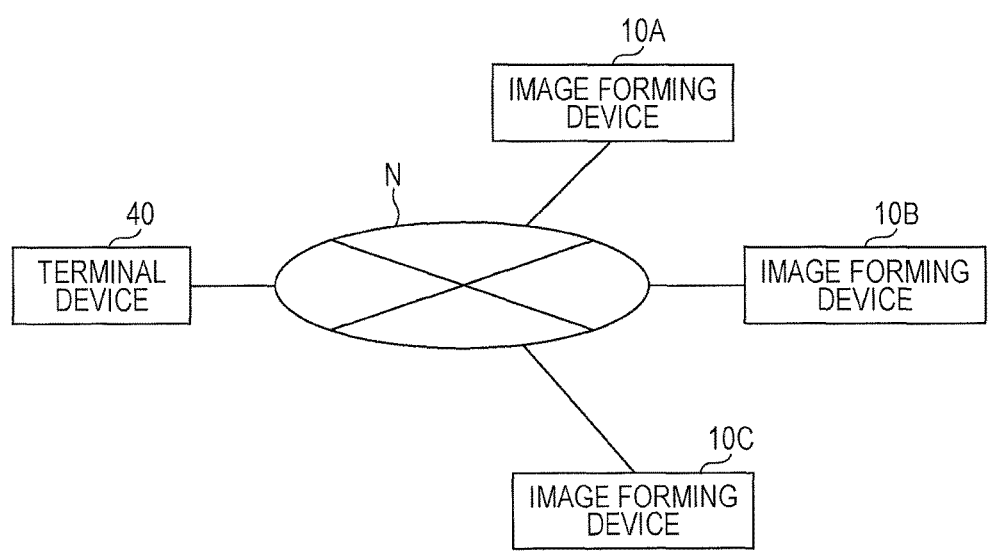
FIG. 1 is a block diagram illustrating an image forming system according to an exemplary embodiment of the present invention.

FIG. 1 illustrates an example of an image forming system according to an exemplary embodiment of the present invention. The image forming system includes multiple image forming devices (as an example, the image forming devices 10A, 10B, and 10C). Note that when the image forming devices 10A, 10B, and 10C are not being individually distinguished, the collective term "image forming device 10" will be used. The multiple image forming devices 10 are connected to a communication link N such as a network. Also, a terminal device 40 is connected to the communication link N. Note that although the image forming system includes three image forming devices 10 in the example illustrated in FIG. 1, this is merely one example, and the image forming system may also include one, or four or more, image forming devices 10. Additionally, multiple terminal devices 40 may also be connected to the communication link N. A server such as a print server may also be connected to the communication link N.

The image forming device 10 is an electrophotographic printer, for example. The terminal device 40 is equipped with a function of transmitting image data to the image forming device 10. The image forming device 10 is equipped with a function of storing image data transmitted from the terminal device 40.

Figure 2:
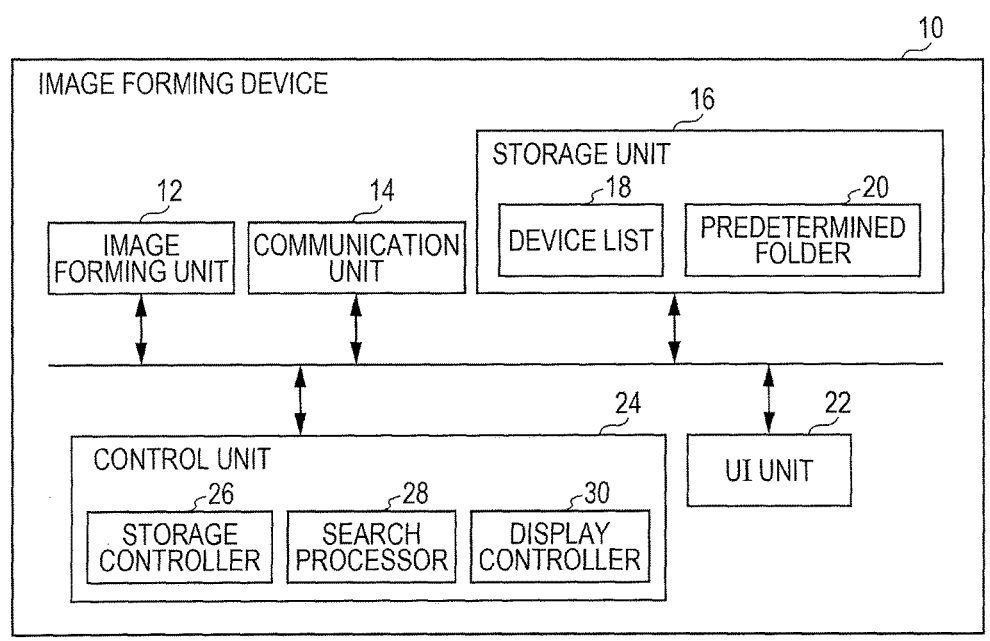
FIG. 2 is a block diagram illustrating an image forming device according to an exemplary embodiment.

FIG. 2 illustrates a configuration of the image forming device 10. An image forming unit 12 forms an image corresponding to image data on a print medium such as paper. A communication unit 14 is a communication interface connected to the communication link N. The communication unit 14 is equipped with a function of receiving data from another device, and a function of transmitting data to another device.

A storage unit 16 is a storage device such as a hard disk. The storage unit 16 stores a device list 18. In addition, a predetermined folder 20 is provided in the storage unit 16.

The device list 18 is information that indicates all image forming devices 10 included in the image forming system. The device list 18 includes device identification information (such as a device ID or device name) for identifying each image forming device 10. Note that when only one image forming device 10 is included in the image forming system, the device list 18 may also not be stored in the storage unit 16 of the image forming device 10.

The predetermined folder 20 is a specific storage area in the storage unit 16, such as a storage area in a storage device such as a hard disk, for example. One or multiple predetermined folders 20 are provided in the storage unit 16. Image data is stored in the predetermined folder 20. Predetermined folder identification information (such as a predetermined folder ID or predetermined folder name) is associated with each predetermined folder 20. As one applied example, suppose that a user's own name (full name or last name) is used as the predetermined folder identification information. In addition, attribute information is associated with the predetermined folder 20 in some cases. Attribute information is information used as supplementary information for identifying the predetermined folder 20. The attribute information may be color information, a password, a tag (supplementary information) such as time information, and the like. The user judges whether or not to assign attribute information to a predetermined folder, for example. Multiple types of attribute information may also be associated with the predetermined folder 20. For example, color information and a password may be associated with the predetermined folder 20.

A user interface unit (UI unit) 22 includes an operating unit and a display unit. The operating unit is an input device such as an operating panel. The display unit is a display device such as a liquid crystal display.

A control unit 24 controls the operation of each component of the image forming device 10. Also, the control unit 24 includes a storage controller 26, a search processor 28, and a display controller 30.

The storage controller 26 causes the storage unit 16 to store image data sent from the terminal device 40. In the present exemplary embodiment, the storage controller 26 stores image data in a predetermined folder 20 specified by the user. If the user gives an instruction to generate a new predetermined folder 20, the storage controller 26 generates a new predetermined folder 20. The storage controller 26 associates predetermined folder identification information with the predetermined folder 20. The predetermined folder identification information is input by the user using the terminal device 40, for example. In addition, the specification of a predetermined folder 20 in which to store image data, and the instruction to generate a new predetermined folder 20, may be performed by the user using the terminal device 40, for example. Note that the same predetermined folder identification information may be assigned to multiple predetermined folders 20.

In addition, the storage controller 26 is equipped with a function of associating attribute information to the predetermined folder 20. The attribute information is input by the user using the terminal device 40, for example. For example, when storing image data in a predetermined folder, attribute information is input by the user. Specifically, the user specifies the color of the relevant predetermined folders, sets a password for the relevant predetermined folder, or assigns a tag to the relevant predetermined folder. Multiple types of attribute information may also be specified by the user. In this case, the multiple types of attribute information are associated with the predetermined folder. For example, if the user specifies a color and a password, the color and the password are associated with the predetermined folder. Note that the same attribute information may be assigned to multiple predetermined folders 20.

The search processor 28 references the device list 18, accesses the image forming devices 10 included in the device list 18, and searches for predetermined folders 20 in each image forming device 10. Additionally, the search processor 28 acquires the predetermined folder identification information of each predetermined folder 20. Also, if attribute information is associated with a predetermined folder 20, the search processor 28 acquires the attribute information. If the image forming device 10 is accessing itself, the search processor 28 acquires the predetermined folder identification information and the attribute information of a predetermined folder 20 from the storage unit 16 in the image forming device 10 itself. As an example, the search processor 28 searches for all predetermined folders 20 in all image forming devices 10, and acquires all predetermined folder identification information. As another example, the search processor 28 may also search for predetermined folders in a specific image forming device 10, and acquire predetermined folder identification information. For example, if the user specifies a specific image forming device 10, the search processor 28 searches for predetermined folders in the specific image forming device 10. In addition, the search processor 28 acquires, from each predetermined folder 20, image identification information (such as an image ID) for identifying image data being stored in each predetermined folder 20.

The display controller 30 causes the display unit of the UI unit 22 to display various information. In the present exemplary embodiment, the display controller 30 causes the display unit of the UI unit 22 to display predetermined folder identification information and image identification information acquired by the search processor 28. For example, the display controller 30 causes the display unit to display predetermined folder identification information. Subsequently, if the user specifies predetermined folder identification information, the display controller 30 causes the display unit to display the image identification information of image data being stored in the predetermined folder 20 associated with the specified predetermined folder identification information.

In the present exemplary embodiment, when multiple predetermined folders 20 associated with the same predetermined folder identification information are found by search, the display controller 30 causes the display unit to display representational information that collectively represents the multiple predetermined folders 20.

When multiple predetermined folders 20 associated with the same predetermined folder identification information and the same type of attribute information are found by search, the display controller 30 may also cause the display unit to display representational information that collectively represents the multiple predetermined folders 20. For example, suppose that a password is used as attribute information. In this case, the display controller 30 causes the display unit to collectively display multiple predetermined folders 20 which are associated with the same predetermined folder identification information, and with which a password is associated as attribute information.

As another example, when multiple predetermined folders 20 associated with the same predetermined folder identification information and the same attribute information are found by search, the display controller 30 may also cause the display unit to display representational information that collectively represents the multiple predetermined folders 20. Color information or a tag, for example, is anticipated as the attribute information in this case. For example, suppose that color information is used as attribute information. In this case, the display controller 30 causes the display unit to collectively display multiple predetermined folders 20 which are associated with the same predetermined folder identification information, and with which the same color (for example, "red") is associated as attribute information.

If the user specifies representational information, the display controller 30 conducts a different display process depending on whether or not a predetermined folder 20 with associated attribute information is included among the multiple predetermined folders 20 corresponding to the specified representational information. In other words, the display controller 30 conducts a process of displaying image identification information, while using a different process of displaying the image identification information of image data stored in each of the multiple predetermined folders 20 depending on whether or not attribute information exists.

As a specific display process, the first display process, the second display process, or the third display process described below is executed.

If no attribute information is associated with any of the multiple predetermined folders 20 corresponding to the specified representational information, or in other words, if there only exist predetermined folders 20 without associated attribute information among the multiple predetermined folders 20, the first display process is executed. In the first display process, the display controller 30 causes the display unit to display the image identification information of image data being stored in the multiple predetermined folders 20.

Also, if attribute information is associated with all of the multiple predetermined folders 20 corresponding to the specified representational information, or in other words, if there only exist predetermined folders 20 with associated attribute information among the multiple predetermined folders 20, the second display process is executed. In the second display process, the display controller 30 causes the display unit to display an attribute information input field or specification field. If attribute information is input or specified via the input field or the specification field, the display controller 30 specifies the predetermined folders 20 associated with the attribute information, and causes the display unit to display the image identification information of image data being stored in the relevant predetermined folders 20. For example, if a password is used as the attribute information, the display controller 30 causes the display unit to display an input field for inputting a password. If the user inputs a password, the display controller 30 specifies the predetermined folders 20 set with a password matching the input password, and causes the display unit to display the image identification information of image data being stored in the relevant predetermined folders 20. If color information is used as the attribute information, the display controller 30 causes the display unit to display a specification field for specifying color. If the user specifies a color, the display controller 30 specifies the predetermined folders 20 set with the same color as the specified color, and causes the display unit to display the image identification information of image data being stored in the relevant predetermined folders 20. Besides the above, a similar process is also executed when a tag is used as attribute information.

Also, if there is a mixture of predetermined folders 20 having associated attribute information (predetermined folders with attribute information) and predetermined folders 20 not having associated attribute information (predetermined folders without attribute information) among the multiple predetermined folders 20 corresponding to the specified representational information, the third display process is executed. In the third display process, the display controller 30 causes the display unit to display the image identification information of image data being stored in the predetermined folders without attribute information. In addition, when the user inputs or specifies attribute information, the display controller 30 specifies the predetermined folders with attribute information associated with the attribute information, and causes the display unit to display the image identification information of image data being stored in the relevant predetermined folders with attribute information.

If the user specifies image identification information, the search processor 28 acquires image data corresponding to the specified image identification information from the predetermined folder 20 where the relevant image data is stored. The image forming unit 12 forms an image corresponding to the acquired image data on a sheet of paper.

Note that when there is one predetermined folder 20 associated with the same predetermined folder identification information, the display controller 30 causes the display unit to display the relevant predetermined folder identification information. The predetermined folder identification information may also be considered to be representational information. If attribute information is associated with the predetermined folder, the display controller 30 causes the display unit to display the predetermined folder identification information, while also causing the display unit to display information corresponding to the attribute information. For example, if color information is specified as the attribute information, the display controller 30 causes the display unit to display the predetermined folder identification information using that color. As an example, if "red" is specified as the color, the predetermined folder identification information is displayed in red. Also, if a password is set as the attribute information, the display controller 30 causes information indicating that a password is set (for example, a key image) to be superimposed onto or displayed near the predetermined folder identification information. For example, if the user specifies the relevant predetermined folder identification information, the display controller 30 causes the display unit to display a password input field. If the user inputs a password, the control unit 24 validates the input password against the password set for the relevant predetermined folder. If validation is successful (for example, if both passwords match), the display controller 30 causes the display unit to display the image identification information of image data being stored in the relevant predetermined folder. Also, when a tag is assigned as attribute information, the display controller 30 causes the tag to be superimposed onto or displayed near the predetermined folder identification information.

The image forming device 10 may also be equipped with a user authentication function. In this case, authentication information for authenticating users is stored in the storage unit 16. The authentication information includes user identification information (such as a user ID) and security information (such as a password), for example. If authentication information is input from the UI unit 22 or a card-reading device, the control unit 24 validates the input authentication information against the authentication information stored in the storage unit 16. If authentication is successful (for example, if both pieces of authentication information match), the control unit 24 may allow the user to operate the image forming device 10, or allow access to another image forming device 10, server, or the like, for example. Note that authentication information may also be stored on an authentication server, and the authentication server may conduct authentication. In this case, authentication information may not be stored in the storage unit 16. Obviously, in the present exemplary embodiment, user authentication may also not be executed.

The image forming device 10 may also be a printer that forms an image according to a method other than an electrophotographic method. The image forming device 10 may also be equipped with at least one function from among a copy function, a scan function, and a facsimile function.

Figure 3:
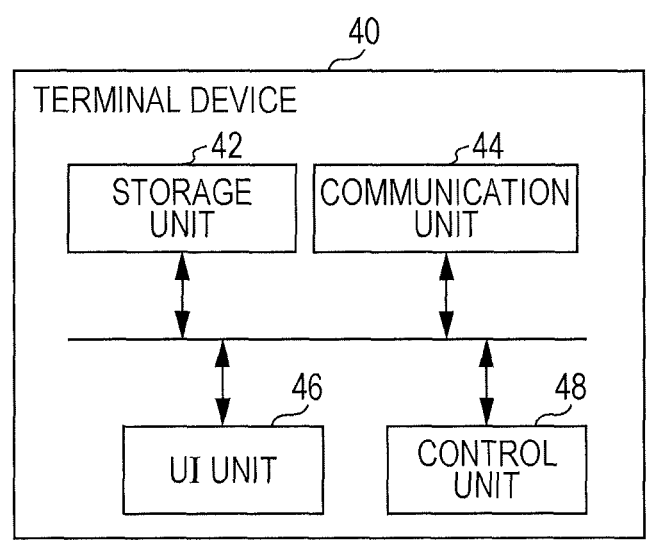
FIG. 3 is a block diagram illustrating a terminal device.

FIG. 3 illustrates a configuration of the terminal device 40. A storage unit 42 is a storage device such as a hard disk. A printer driver is stored in the storage unit 42. A printer driver is a program that has a function of controlling the image forming device 10. A communication unit 44 is a communication interface connected to the communication link N. The communication unit 44 is equipped with a function of receiving data from another device, and a function of transmitting data to another device. For example, the communication unit 44 is equipped with a function of transmitting image data specified by the user to the image forming device 10. Note that the image forming device 10 configured as the destination of image data may be predetermined, or specified by the user at the time of transmission. A user interface unit (UI unit) 46 includes an operating unit and a display unit. The operating unit is an input device such as a keyboard and mouse, for example. The display unit is a display device such as a liquid crystal display. A control unit 48 controls the operation of each component of the terminal device 40. Note that destination information indicating the image forming device 10 configured as the destination of image data may also be stored in the storage unit 42. In the example illustrated in FIG. 1, the destination information is information indicating one of the image forming devices 10A, 10B, and 10C. The destination information is device identification information of the image forming device 10, for example. As another example, the destination information may also be an Internet Protocol (IP) address assigned to the image forming device 10. Note that the destination of image data may also be a server such as a print server.

(Overview of Processing in Image Forming System)

An overview of processing in an image forming system according to the present exemplary embodiment will now be described. First, the user uses the UI unit 46 of the terminal device 40 to specify image data to be printed, and issues an instruction to store image data. The communication unit 44 transmits the specified image data to the image forming device 10. The destination image forming device 10 may be a device specified by the user from among the image forming devices 10A, 10B, and 10C, or a predetermined device. Alternatively, when only one image forming device 10 is included in the image forming system, the image data is transmitted to that image forming device 10. Furthermore, as another example, image data may be transmitted to a server, and image data may be stored in a predetermined folder on the server. Herein, suppose that the image forming device 10A is selected as the destination image forming device 10. The communication unit 14 of the image forming device 10A receives the image data transmitted from the terminal device 40. Subsequently, the storage controller 26 causes the storage unit 16 to store the image data. At this point, if the user uses the UI unit 46 of the terminal device 40 to specify a predetermined folder 20, the storage controller 26 stores the image data in the specified predetermined folder 20. If the user gives an instruction to generate a new predetermined folder 20, the storage controller 26 generates a new predetermined folder 20, and stores the image data in that predetermined folder 20. Also, if the user specifies attribute information, the storage controller 26 associates the attribute information with the predetermined folder 20. In this way, image data is stored in the image forming device 10. By having multiple users use the image forming system, the generation of multiple predetermined folders 20 is anticipated.

After giving the storage instruction, the user moves to one of the image forming devices 10A, 10B, and 10C. For example, the user may move to the image forming device 10 that he or she normally uses, and if that image forming device 10 is already in use, the user may move to another image forming device 10, or move to the image forming device 10 that is closest to the user's location. When only one image forming device 10 is included in the image forming system, the user moves to that image forming device 10.

For example, suppose that the user moves to the image forming device 10B. If the user uses the UI unit 22 of the image forming device 10B to issue a search instruction, the search processor 28 of the image forming device 10B searches all predetermined folders 20 in all image forming devices 10, and acquires all predetermined folder identification information. If predetermined folders 20 are provided in a server, the search processor 28 acquires predetermined folder identification information from the server. Also, if attribute information is associated with a predetermined folder 20, the search processor 28 acquires the attribute information. In addition, the search processor 28 acquires the image identification information of image data being stored in each predetermined folder 20. Subsequently, the display controller 30 of the image forming device 10B executes one of the first display process, the second display process, and the third display process above. Consequently, image identification information is displayed on the display unit of the UI unit 22. Subsequently, if the user specifies image identification information, the search processor 28 of the image forming device 10B acquires the image data associated with the specified image identification information from a predetermined folder 20. If the image data is being stored in an image forming device 10 other than the image forming device 10B (such as the image forming device 10A or 10C, or a server), the search processor 28 of the image forming device 10B acquires the image data from the other image forming device 10 or server. The image forming unit 12 forms an image corresponding to the image data on a sheet of paper.

In this way, the image forming device 10 is equipped with a function of printing image data transmitted from the terminal device 40. In addition, if the image forming system includes multiple image forming devices 10, the individual image forming device 10 may also be equipped with a function of acquiring and printing image data being stored in another image forming device 10. In this case, the user is not limited to storing image data in the image forming device 10 that actually executes printing. If the image data is stored in any of the multiple image forming devices 10 included in the image forming system, printing may be realized at any of the image forming devices 10.

Figure 4:
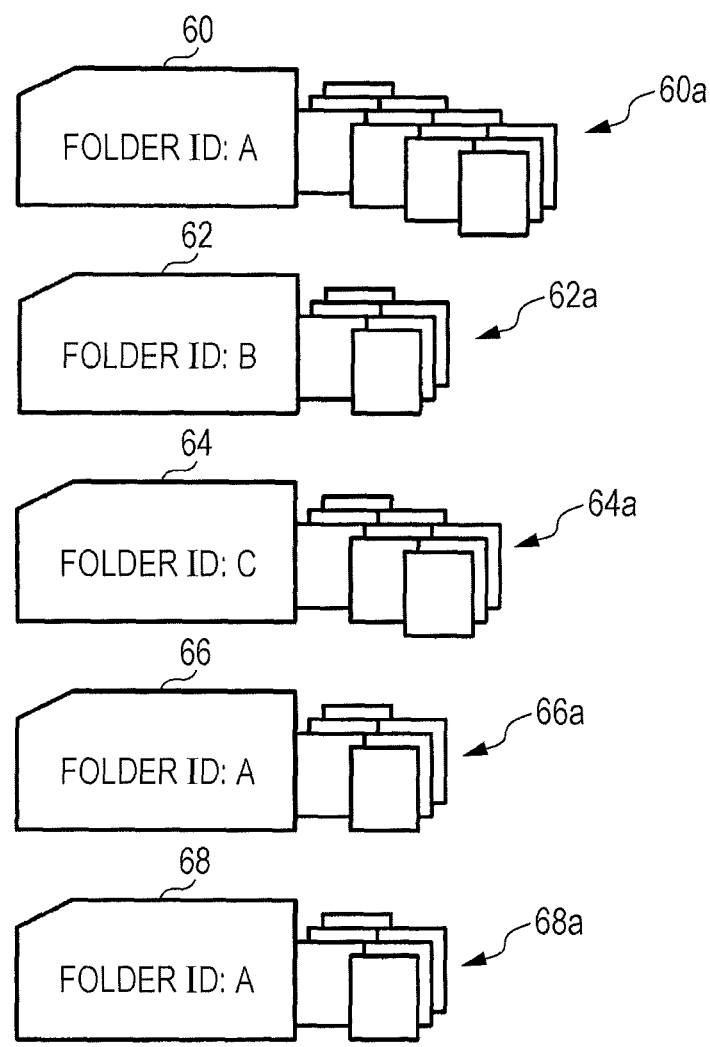
FIG. 4 is a diagram illustrating an example of predetermined folders.

Next, an example display of representational information will be described with reference to FIGS. 4 and 5. FIG. 4 illustrates an example of predetermined folders. As an example, suppose that five predetermined folders are provided. Obviously, it is sufficient to provide one or multiple predetermined folders. The predetermined folders 60 to 68 may be provided in the same image forming device 10, in respectively separate image forming devices 10, or on a server. In the example illustrated in FIG. 1, the predetermined folders 60 to 68 may be provided in only one of the image forming devices 10A, 10B, and 10C, or respectively provided in separate devices among the image forming devices 10A, 10B, and 10C. This applies similarly in the description hereinafter.

A folder ID that acts as predetermined folder identification information is associated with each predetermined folder. Specifically, the folder ID of the predetermined folder 60 is "A". The folder ID of the predetermined folder 62 is "B". The folder ID of the predetermined folder 64 is "C". The folder ID of the predetermined folder 66 is "A". The folder ID of the predetermined folder 68 is "A". In the example illustrated in FIG. 4, the same folder ID "A" is associated with the predetermined folders 60, 66, and 68. For example, when storing image data, a folder ID is assigned according to a user instruction.

An image data group 60a is being stored in the predetermined folder 60. An image data group 62a is being stored in the predetermined folder 62. An image data group 64a is being stored in the predetermined folder 64. An image data group 66a is being stored in the predetermined folder 66. An image data group 68a is being stored in the predetermined folder 68. These image data groups are data stored according to instructions from the same or different users.

If the user uses the UI unit 22 of an image forming device 10 to issue a search instruction, the search processor 28 searches all of the predetermined folders 60 to 68, and acquires all folder IDs. If attribute information is associated with a predetermined folder, the search processor 28 acquires the attribute information. In addition, the search processor 28 acquires the image identification information of image data being stored in each of the predetermined folders 60 to 68.

The display controller 30 causes the display unit of the UI unit 22 to display the acquired folder IDs. At this point, the display controller 30 causes the display unit to display representational information that collectively represents the predetermined folders 60, 66, and 68 associated with the same folder ID "A".

Figure 5:
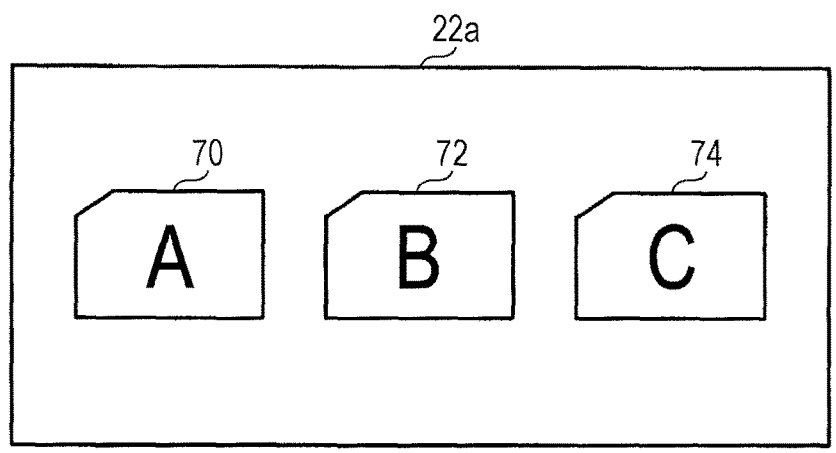
FIG. 5 is a diagram illustrating an example of a screen on a display unit.

FIG. 5 illustrates an example display of folder IDs. Graphic objects 70, 72, and 74 are displayed on the screen 22a of the display unit. The graphic object 70 is information representing the folder ID "A". The graphic object 72 is information representing the folder ID "B". The graphic object 74 is information representing the folder ID "C". The graphic objects 70, 72, and 74 are displayed in order of character code, for example. Obviously, the graphic objects 70, 72, and 74 may also be displayed in another sort order.

As illustrated in FIG. 4, the folder ID of the predetermined folders 60, 66, and 68 is "A", and thus there are three predetermined folders associated with the folder ID "A". In this case, the single graphic object 70 is displayed to represent these three predetermined folders with the folder ID "A". Not all predetermined folders with the folder ID "A" may be displayed. The graphic object 70 corresponds to representational information that collectively represents the predetermined folders 60, 66, and 68 associated with the same folder ID "A". In this way, when multiple predetermined folders with the same folder ID are found by search, the display controller 30 causes the display unit to display one folder ID, without causing the display unit to display all of the multiple folder IDs.

The predetermined folder 62 is the only predetermined folder associated with the folder ID "B". Consequently, the graphic object 72 represents the folder ID "B" itself of the predetermined folder 62. Also, the predetermined folder 64 is the only predetermined folder associated with the folder ID "C". Consequently, the graphic object 74 represents the folder ID "C" itself of the predetermined folder 64.

Figure 6:
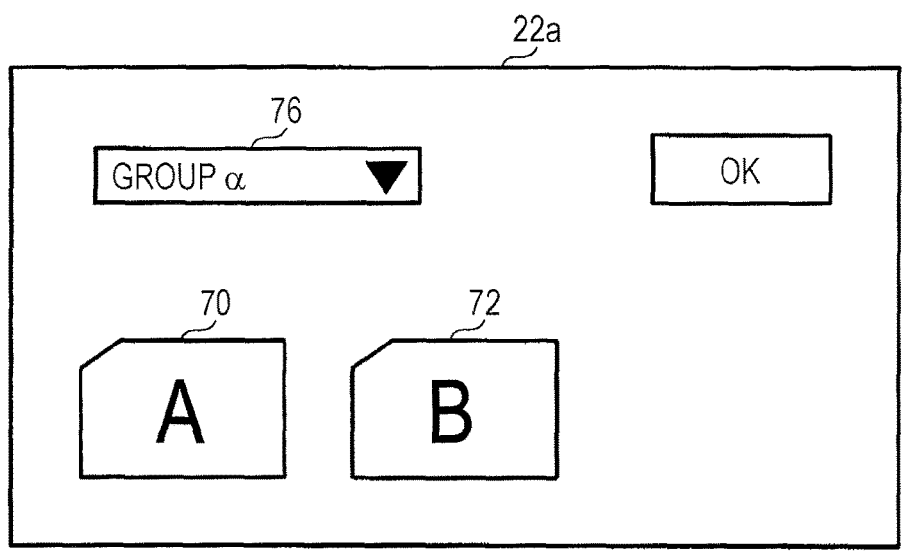
FIG. 6 is a diagram illustrating an example of a screen on a display unit.

FIG. 6 illustrates another example of a screen. In this example, the display controller 30 causes the display unit to display a selection bar 76 for specifying a group of image forming devices 10. For example, the image forming devices 10A, 10B, and 10C may be divided into groups. This grouping is conducted by an administrator or the like of the image forming system. Subsequently, if the user specifies a group on an image forming device 10, the search processor 28 searches the image forming devices 10 belonging to the specified group for predetermined folders, and acquires folder IDs. For example, the user uses the operating unit of the UI unit 22 to specify a group with the selection bar 76. For example, suppose that a group alpha includes the image forming devices 10A and 10B, but does not include the image forming device 10C. If the user specifies the group alpha, the search processor 28 searches the image forming devices 10A and 10B for predetermined folders, and acquires folder IDs. In the example illustrated in FIG. 6, the folder ID "A" and the folder ID "B" are acquired and displayed on the screen 22a. By utilizing a grouping function, the predetermined folder search range is limited, and the search time is potentially shortened. In addition, the size of the search result is reduced. Usage of the grouping function is envisioned when searching the image forming devices 10 belonging to a specific group for image data, for example.

On the screen 22a illustrated in FIG. 5 or 6, if a folder ID is specified by the user, the display controller 30 conducts a display process on the one or more predetermined folders associated with the specified folder ID. The display controller 30 executes one of the first display process, the second display process, and the third display process above, depending on whether or not attribute information exists.

Hereinafter, the first display process, the second display process, and the third display process will be described using specific examples.

(First Display Process)

Figure 7:
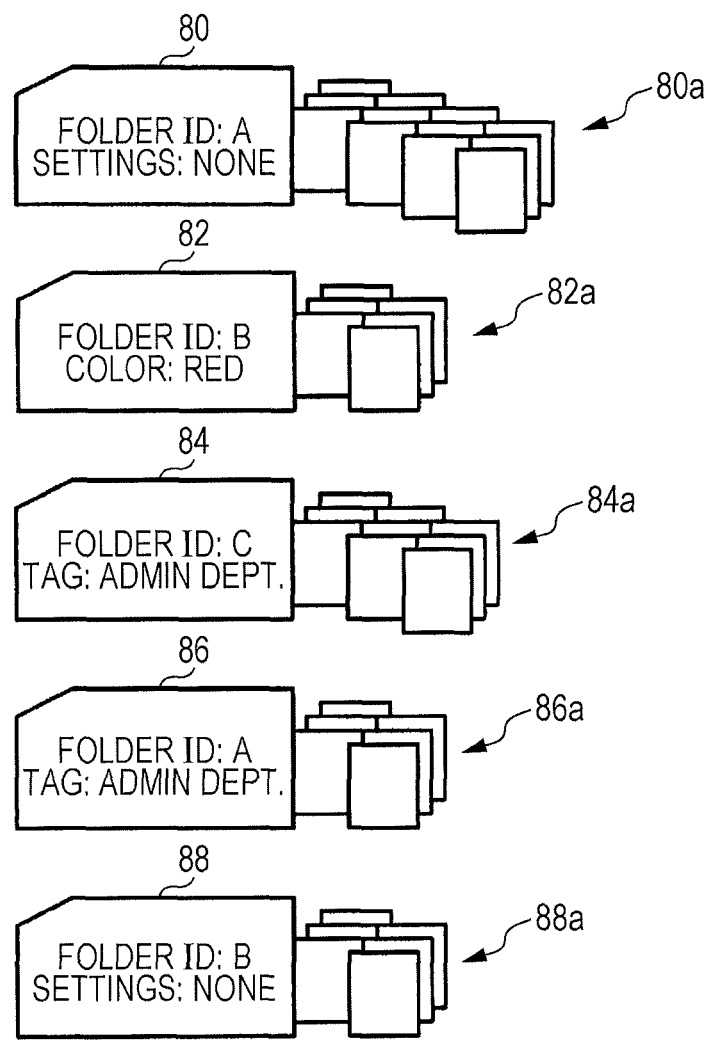
FIG. 7 is a diagram illustrating an example of predetermined folders.

First, the first display process will be described with reference to FIGS. 7 and 8. FIG. 7 illustrates an example of predetermined folders. As an example, suppose that five predetermined folders (predetermined folders 80 to 88) are provided.

The folder ID of the predetermined folder 80 is "A", and no attribute information is associated with the predetermined folder 80. The folder ID of the predetermined folder 82 is "B", and color information is associated with the predetermined folder 82 as attribute information. Specifically, color information indicating "red" is associated with the predetermined folder 82. The folder ID of the predetermined folder 84 is "C", and a tag is associated with the predetermined folder 84 as attribute information. Specifically, a tag indicating "Admin Dept." is associated with the predetermined folder 84. The folder ID of the predetermined folder 86 is "A", and no attribute information is associated with the predetermined folder 86. The folder ID of the predetermined folder 88 is "B", and no attribute information is associated with the predetermined folder 88.

An image data group 80a is being stored in the predetermined folder 80. An image data group 82a is being stored in the predetermined folder 82. An image data group 84a is being stored in the predetermined folder 84. An image data group 86a is being stored in the predetermined folder 86. An image data group 88a is being stored in the predetermined folder 88. These image data groups are data stored according to instructions from the same or different users.

If the user uses the UI unit 22 of an image forming device to issue a search instruction, the search processor 28 searches all of the predetermined folders 80 to 88, and acquires all folder IDs. If attribute information is associated with a predetermined folder, the search processor 28 acquires the attribute information. In addition, the search processor 28 acquires the image identification information of image data being stored in each of the predetermined folders 80 to 88.

The display controller 30 causes the display unit of the UI unit 22 to display the acquired folder IDs. At this point, the display controller 30 causes the display unit to display representational information that collectively represents the predetermined folders 80 and 86 associated with the same folder ID "A". Also, the display controller 30 causes the display unit to display representational information that collectively represents the predetermined folders 82 and 88 associated with the same folder ID "B".

Figure 8A:
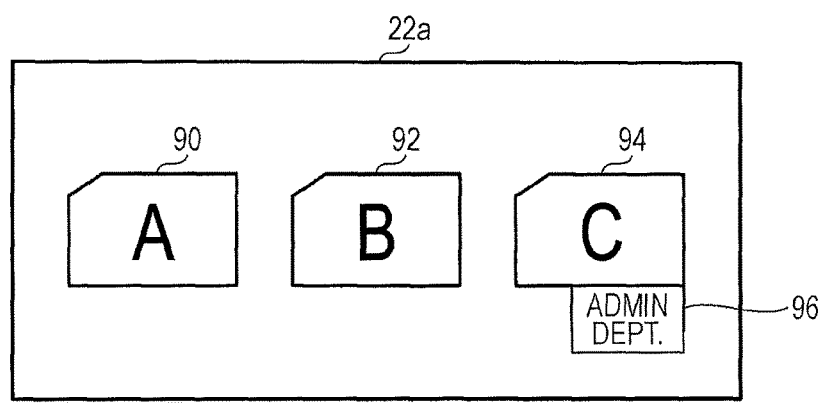
FIGS. 8A and 8B are diagrams illustrating an example of a screen on a display unit.

FIG. 8A illustrates an example display of folder IDs. Graphic objects 90, 92, and 94 are displayed on the screen 22a of the display unit. The graphic object 90 is information representing the folder ID "A". The graphic object 92 is information representing the folder ID "B". The graphic object 94 is information representing the folder ID "C".

The graphic object 90 corresponds to representational information that collectively represents the predetermined folders 80 and 86 associated with the same folder ID. The graphic object 92 corresponds to representational information that collectively represents the predetermined folders 82 and 88 associated with the same folder ID. The graphic object 94 represents the folder ID "C" itself of the predetermined folder 84.

Note that the predetermined folder 84 is the only predetermined folder associated with the folder ID "C", and a tag is assigned to the predetermined folder 84 as attribute information. Consequently, the display controller 30 causes a tag 96 ("Admin Dept.") to be superimposed onto or displayed near the graphic object 94.

For example, suppose that the user uses the UI unit 22 to specify the graphic object 90 (folder ID "A"). As illustrated in FIG. 7, attribute information is not associated with any of the predetermined folders associated with the folder ID "A" (predetermined folders 80 and 86). In other words, among the predetermined folders 80 and 86, there exist only predetermined folders without associated attribute information. In this case, the display controller 30 executes the first display process. Specifically, the display controller 30 causes the display unit to display the image identification information of image data being stored in the predetermined folders 80 and 86.

Figure 8B:
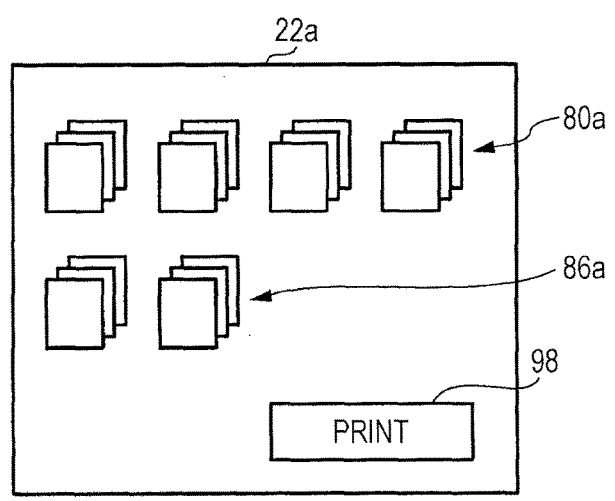

FIG. 8B illustrates this display example. On the screen 22a, the image identification information of the image data group 80a being stored in the predetermined folder 80 and the image identification information of the image data group 86a being stored in the predetermined folder 86 are displayed in a list. Note that the image identification information may also be graphically displayed, for example. This applies similarly in the following described.

If the user specifies image identification information from the list, the search processor 28 acquires image data corresponding to the specified image identification information from a predetermined folders. For example, if image data being stored in the predetermined folder 80 is specified, the search processor 28 acquires the image data from the predetermined folder 80. For example, if the user presses a print button 98, the image forming unit 12 forms an image corresponding to the image data on a sheet of paper.

Note that if the user specifies the graphic object 92 (folder ID "B"), the third display process discussed later is executed. In other words, among the multiple predetermined folders associated with the folder ID "B", there exists a mixture of the predetermined folder 82 with associated attribute information, and the predetermined folder 88 without associated attribute information. In this case, the third display process is executed.

The predetermined folder 84 is the only predetermined folder with the folder ID "C". Consequently, if the user specifies the graphic object 94 (folder ID "C"), the display controller 30 causes the display unit to display the image identification information of the image data group 84a being stored in the predetermined folder 84 with the folder ID "C".

(Second Display Process)

Figure 9:
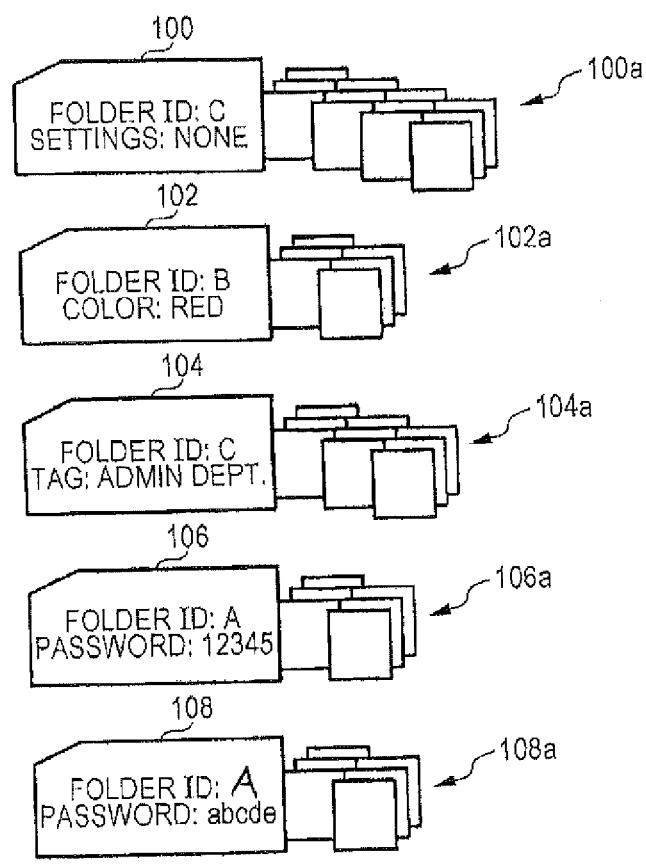
FIG. 9 is a diagram illustrating an example of predetermined folders.

Next, the second display process will be described with reference to FIGS. 9, 10, and 11. FIG. 9 illustrates an example of predetermined folders. As an example, suppose that five predetermined folders (predetermined folders 100 to 108) are provided.

The folder ID of the predetermined folder 100 is "C", and no attribute information is associated with the predetermined folder 100. The folder ID of the predetermined folder 102 is "B", and color information is associated with the predetermined folder 102 as attribute information. Specifically, color information indicating "red" is associated with the predetermined folder 102. The folder ID of the predetermined folder 104 is "C", and a tag is associated with the predetermined folder 104 as attribute information. Specifically, a tag indicating "Admin Dept." is associated with the predetermined folder 104. The folder ID of the predetermined folder 106 is "A", and a password is associated with the predetermined folder 106 as attribute information. Specifically, the password "12345" is associated with the predetermined folder 106. The folder ID of the predetermined folder 108 is "A", and a password is associated with the predetermined folder 108 as attribute information. Specifically, the password "abcde" is associated with the predetermined folder 108.

An image data group 100a is being stored in the predetermined folder 100. An image data group 102a is being stored in the predetermined folder 102. An image data group 104a is being stored in the predetermined folder 104. An image data group 106a is being stored in the predetermined folder 106. An image data group 108a is being stored in the predetermined folder 108. These image data groups are data stored according to instructions from the same or different users.

If the user uses the UI unit 22 of an image forming device 10 to issue a search instruction, the search processor 28 searches all of the predetermined folders 100 to 108, and acquires all folder IDs. If attribute information is associated with a predetermined folder, the search processor 28 acquires the attribute information. In addition, the search processor 28 acquires the image identification information of image data being stored in each of the predetermined folders 100 to 108.

The display controller 30 causes the display unit of the UI unit 22 to display the acquired folder IDs. At this point, the display controller 30 causes the display unit to display representational information that collectively represents the predetermined folders 106 and 108 associated with the same folder ID "A". Also, the display controller 30 causes the display unit to display representational information that collectively represents the predetermined folders 100 and 104 associated with the same folder ID "C".

Figure 10A:
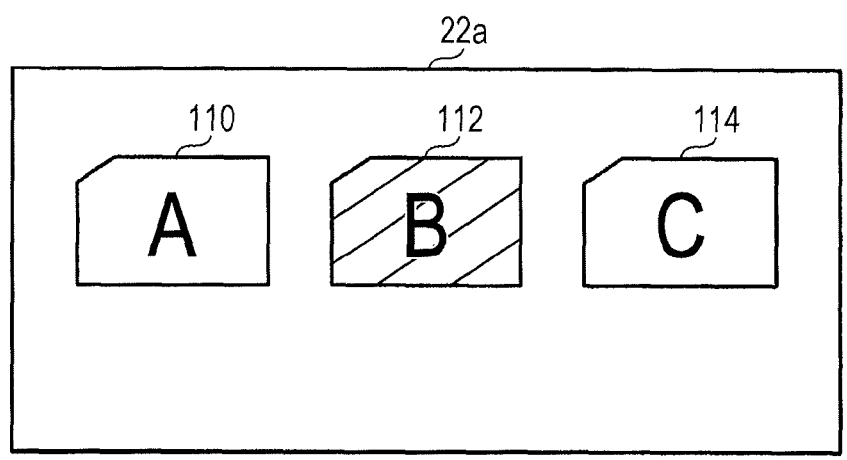
FIGS. 10A and 10B are diagrams illustrating an example of a screen on a display unit.

FIG. 10A illustrates an example display of folder IDs. Graphic objects 110, 112, and 114 are displayed on the screen 22a of the display unit. The graphic object 110 is information representing the folder ID "A". The graphic object 112 is information representing the folder ID "B". The graphic object 114 is information representing the folder ID "C".

The graphic object 110 corresponds to representational information that collectively represents the predetermined folders 106 and 108. The same folder ID "A" is associated with the predetermined folders 106 and 108. In addition, the attribute information associated with the predetermined folders 106 and 108 is a password, and thus the type of attribute information is the same. Consequently, the graphic object 110 corresponds to information that collectively represents the multiple predetermined folders (predetermined folders 106 and 108) associated with the same folder ID and the same type of attribute information. The graphic object 112 represents the folder ID "B" itself of the predetermined folder 102. The graphic object 114 corresponds to representational information that collectively represents the predetermined folders 100 and 104 associated with the same folder ID.

Note that the predetermined folder 102 is the only predetermined folder with the folder ID "B", and color information is associated with the predetermined folder 102 as attribute information. Since the color is "red", the display controller 30 displays the graphic object 112 indicating the folder ID "B" in red.

Figure 10B:
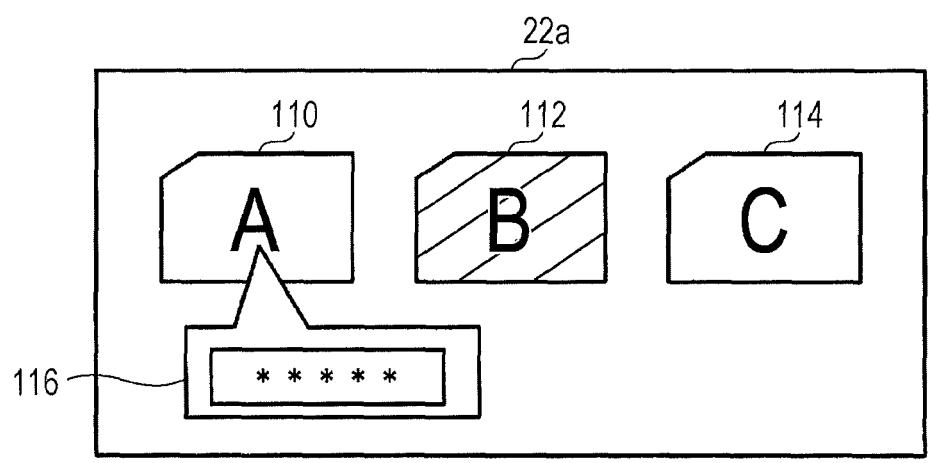

For example, suppose that the user uses the UI unit 22 to specify the graphic object 110 (folder ID "A"). As illustrated in FIG. 9, a password is associated as attribute information with all of the predetermined folders associated with the folder ID "A" (predetermined folders 106 and 108). In other words, among the predetermined folders 106 and 108, there exist only predetermined folders with an associated password. In this case, the display controller 30 executes the second display process. Specifically, as illustrated in FIG. 10B, the display controller 30 causes the display unit to display a password input field 116. The input field 116 is superimposed onto or displayed near the graphic object 110, for example.

If the user uses the UI unit 22 to input a password into the input field 116, the display controller 30 specifies the predetermined folder associated with a password matching the input password, and causes the display unit to display the image identification information of image data being stored in the relevant predetermined folder. For example, if the user inputs the password "12345", the display controller 30 specifies the predetermined folder associated with the folder ID "A" and also set with the password "12345". In the example illustrated in FIG. 9, the predetermined folder 106 is specified. The display controller 30 causes the display unit to display the image identification information of the image data group 106a being stored in the predetermined folder 106.

Figure 11:
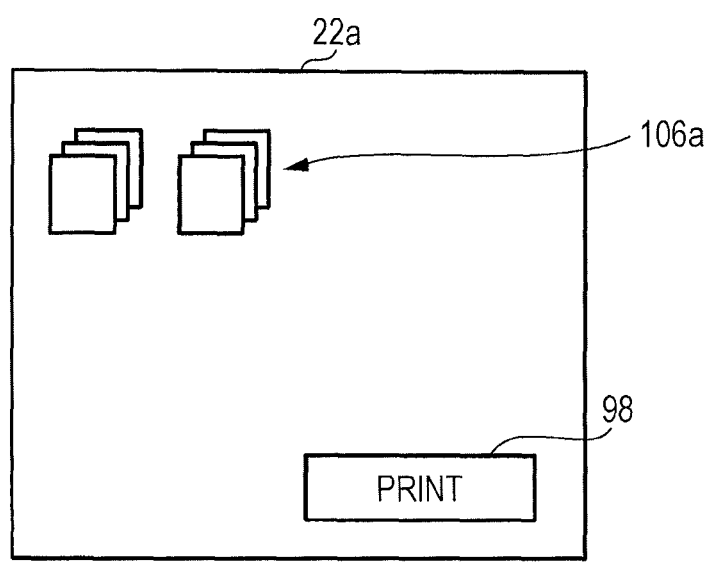
FIG. 11 is a diagram illustrating an example of a screen on a display unit.

FIG. 11 illustrates an example display of image identification information. On the screen 22a, the image identification information of the image data group 106a being stored in the predetermined folder 106 is displayed in a list. If the user specifies image identification information from the list and presses the print button 98, the image data corresponding to that image identification information is acquired and printed.

Note that the predetermined folder 102 is the only predetermined folder with the folder ID "B". Consequently, if the user specifies the graphic object 112 (folder ID "B"), the display controller 30 causes the display unit to display the image identification information of the image data group 102a being stored in the predetermined folder 102 with the folder ID "B".

Also, if the user specifies the graphic object 114 (folder ID "C"), the third display process discussed later is executed. This is because a predetermined folder with attribute information (the predetermined folder 104) and a predetermined folder without attribute information (the predetermined folder 100) are mixed together.

(Third Display Process)

Figure 12:
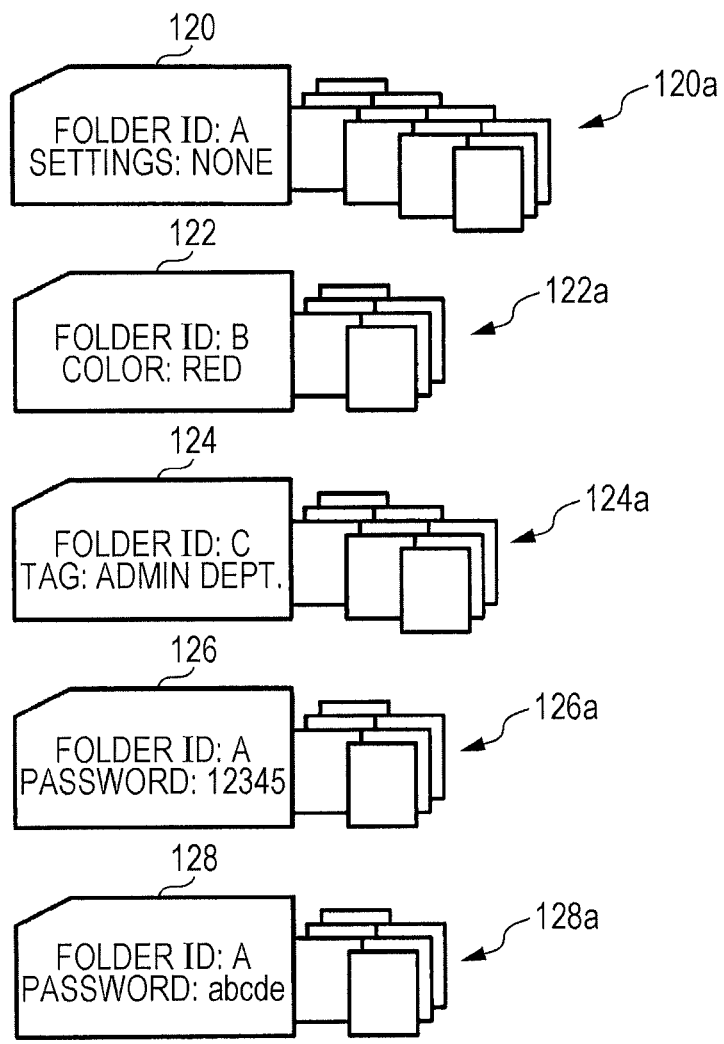
FIG. 12 is a diagram illustrating an example of predetermined folders.

Next, the third display process will be described with reference to FIGS. 12 and 13. FIG. 12 illustrates an example of predetermined folders. As an example, suppose that five predetermined folders (predetermined folders 120 to 128) are provided.

The folder ID of the predetermined folder 120 is "A", and no attribute information is associated with the predetermined folder 120. The folder ID of the predetermined folder 122 is "B", and color information is associated with the predetermined folder 122 as attribute information. Specifically, color information indicating "red" is associated with the predetermined folder 122. The folder ID of the predetermined folder 124 is "C", and a tag is associated with the predetermined folder 124 as attribute information. Specifically, a tag indicating "Admin Dept." is associated with the predetermined folder 124. The folder ID of the predetermined folder 126 is "A", and a password is associated with the predetermined folder 126 as attribute information. Specifically, the password "12345" is associated with the predetermined folder 126. The folder ID of the predetermined folder 128 is "A", and a password is associated with the predetermined folder 128 as attribute information. Specifically, the password "abcde" is associated with the predetermined folder 128.

An image data group 120a is being stored in the predetermined folder 120. An image data group 122a is being stored in the predetermined folder 122. An image data group 124a is being stored in the predetermined folder 124. An image data group 126a is being stored in the predetermined folder 126. An image data group 128a is being stored in the predetermined folder 128. These image data groups are data stored according to instructions from the same or different users.

If the user uses the UI unit 22 of an image forming device 10 to issue a search instruction, the search processor 28 searches all of the predetermined folders 120 to 128, and acquires all folder IDs. If attribute information is associated with a predetermined folder, the search processor 28 acquires the attribute information. In addition, the search processor 28 acquires the image identification information of image data being stored in each of the predetermined folders 120 to 128.

The display controller 30 causes the display unit of the UI unit 22 to display the acquired folder IDs. At this point, the display controller 30 causes the display unit to display representational information that represents the predetermined folders 120, 126, and 128 associated with the same folder ID "A".

Figure 13A:
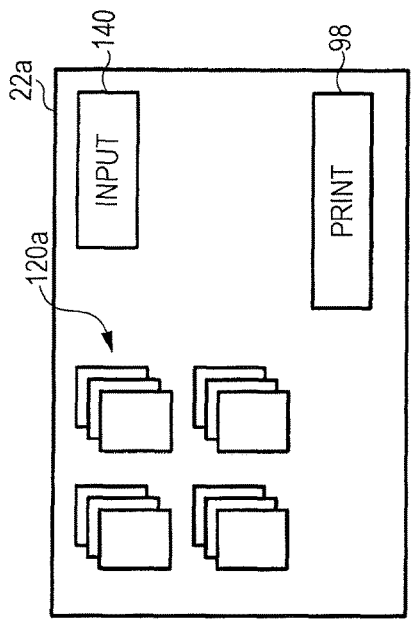
FIGS. 13A to 13D are diagrams illustrating an example of a screen on a display unit.

FIG. 13A illustrates an example display of folder IDs. Graphic objects 130, 132, and 134 are displayed on the screen 22a of the display unit. The graphic object 130 is information representing the folder ID "A". The graphic object 132 is information representing the folder ID "B". The graphic object 134 is information representing the folder ID "C". The graphic object 130 corresponds to representational information that collectively represents the predetermined folders 120, 126, and 128 associated with the same folder ID "A". The graphic object 132 represents the folder ID "B" itself of the predetermined folder 122. The graphic object 134 represents the folder ID "C" itself of the predetermined folder 124.

Note that the predetermined folder 122 is the only predetermined folder with the folder ID "B", and color information is associated with the predetermined folder 122 as attribute information. Since the color is "red", the display controller 30 displays the graphic object 132 indicating the folder ID "B" in red. Also, the predetermined folder 124 is the only predetermined folder with the folder ID "C", and a tag is associated with the predetermined folder 124 as attribute information. Consequently, the display controller 30 causes a tag 136 ("Admin Dept.") to be superimposed onto or displayed near the graphic object 134.

For example, suppose that the user uses the UI unit 22 to specify the graphic object 130 (folder ID "A"). As illustrated in FIG. 12, among the multiple predetermined folders associated with the folder ID "A", there exists a mixture of the predetermined folders 126 and 128 with a password associated as attribute information, and the predetermined folder 120 without a password associated as attribute information. The predetermined folders 126 and 128 correspond to an example of a predetermined folder with attribute information, while the predetermined folder 120 corresponds to an example of a predetermined folder without attribute information. In this case, the display controller 30 executes the third display process.

Figure 13B:
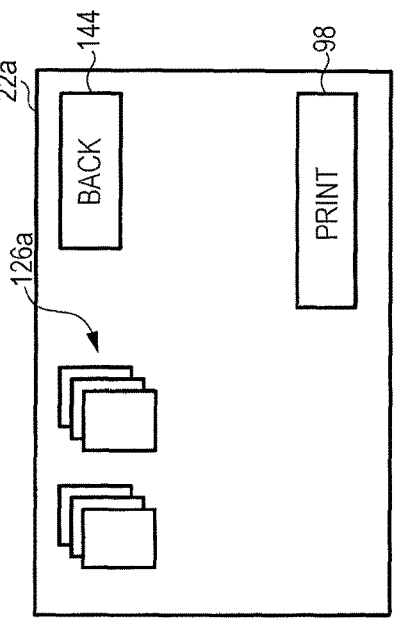

Specifically, as illustrated in FIG. 13B, the display controller 30 causes the display unit to display a list of the image identification information of the image data group 120a being stored in the predetermined folder 120 without an associated password. In addition, the display controller 30 causes the display unit to display an instruction button 140 that causes a password input field to be displayed. If the user specifies image identification information from the list and presses the print button 98, the image data corresponding to that image identification information is acquired and printed.

Figure 13C:
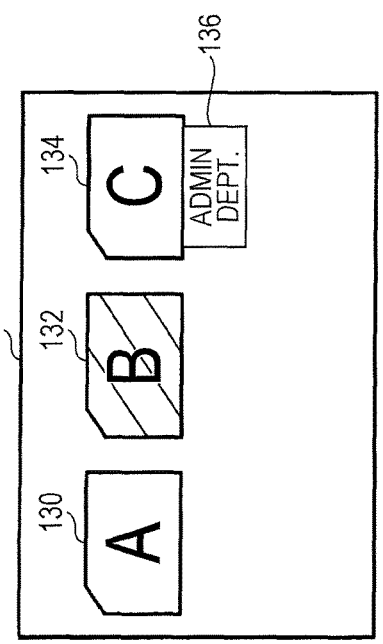

On the other hand, if the user uses the UI unit 22 to press the instruction button 140, the display controller 30 causes the display unit to display a password input field 142, as illustrated in FIG. 13C.

If the user uses the UI unit 22 to input a password into the input field 142, the display controller 30 specifies the predetermined folder 20 associated with a password matching the input password, and causes the display unit to display the image identification information of image data being stored in the relevant predetermined folder. For example, if the user inputs the password "12345", the display controller 30 specifies the predetermined folder associated with the folder ID "A" and also set with the password "12345". In the example illustrated in FIG. 12, the predetermined folder 126 is specified. The display controller 30 causes the display unit to display the image identification information of the image data group 126a being stored in the predetermined folder 126.

Figure 13D:
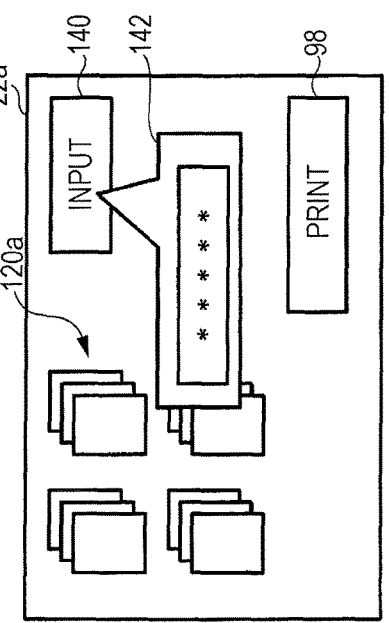

FIG. 13D illustrates an example display of the image identification information. On the screen 22a, the image identification information of the image data group 126a is displayed in a list. At this point, the display controller 30 causes the display unit to display the image identification information of the image data group 126a instead of the image identification information of the image data group 120a that was previously being displayed. If the user specifies image identification information from the list and presses the print button 98, the image data corresponding to that image identification information is acquired and printed. In addition, a back button 144 is displayed on the screen 22a.

If the user presses the back button 144, the display controller 30 causes the display unit to display the previous screen. For example, the display controller 30 causes the display unit to display the image identification information of the image data group 120a, as illustrated in FIG. 13B.

Note that if the user specifies the graphic object 132 (folder ID "B"), the image identification information of the image data group 122a being stored in the predetermined folder 122 with the folder ID "B" is displayed. Also, if the user specifies the graphic object 134 (folder ID "C"), the image identification information of the image data group 124a being stored in the predetermined folder 124 with the folder ID "C" is displayed.

Figure 14:
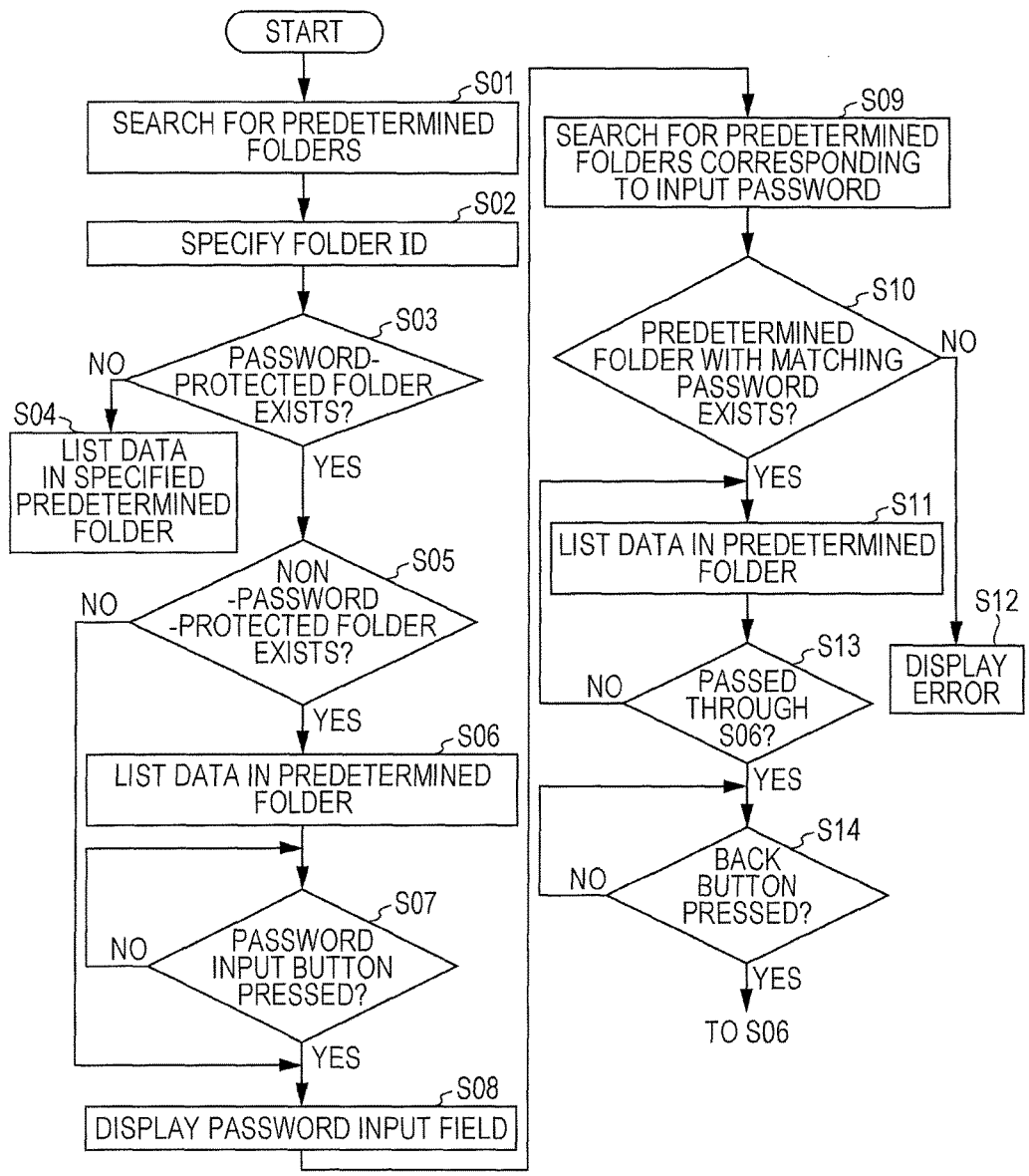
FIG. 14 is a flowchart illustrating an example of a process by an image forming device according to an exemplary embodiment.

Next, a process by an image forming device 10 according to the present exemplary embodiment will be described with reference to the flowchart illustrated in FIG. 14. Herein, suppose that image data is already being stored in a predetermined folder. In addition, suppose that a password is used as attribute information.

First, if the user uses the UI unit 22 of the image forming device 10 to issue a search instruction, the search processor 28 searches all predetermined folders 20 in all image forming devices 10 (S01). Subsequently, the display controller 30 causes the display unit of the UI unit 22 to display the folder IDs of the predetermined folders found by search. If multiple predetermined folders assigned with the same folder ID are found, the display controller 30 causes the display unit to display representational information that collectively represents the relevant predetermined folders.

If the user specifies a folder ID (S02), and there does not exist a predetermined folder configured with a password among the predetermined folders associated with the specified folder ID (S03, No), the process proceeds to step S04. In other words, if no password is configured for any of the predetermined folders associated with the specified folder ID, the process proceeds to step S04. In step S04, the first display process is executed. In this case, the display controller 30 displays on the display unit of the UI unit 22 a list of the image identification information of image data being stored in the one or more predetermined folders associated with the specified folder ID (S04). If the user specifies image identification information from the list and issues a print instruction, the image data corresponding to that image identification information is acquired and printed.

If there exists a predetermined folder configured with a password among the predetermined folders associated with the specified folder ID (S03, Yes), the process proceeds to step S05. Additionally, if there exists a predetermined folder not configured with a password among the predetermined folders associated with the specified folder ID (S05, Yes), the process proceeds to step S06. In other words, if there exists a mixture of predetermined folder configured with a password and predetermined folders not configured with a password among the predetermined folders associated with the specified folder ID, the process proceeds to step S06. In step S06 and thereafter, the third display process is executed. In this case, the display controller 30 causes the display unit to display a list of the image identification information of image data being stored in the one or more predetermined folders which are associated with the specified folder ID and which are not configured with a password (S06). At this stage, if the user specifies image identification information from the list and issues a print instruction, the image data corresponding to that image identification information is acquired and printed. Also, a button for displaying a password input screen is displayed on the display unit, and if the user presses the button (S07, Yes), the process proceeds to step S08.

In step S05, if there does not exist a predetermined folder not configured with a password among the predetermined folders associated with the specified folder ID (S05, No), the process proceeds to step S08. In other words, if a password is configured for all of the predetermined folders associated with the specified folder ID, the process proceeds to step S08. In the processing of step S08 and thereafter, the second display process is executed.

In step S08, the display controller 30 causes the display unit to display a password input field. If the user inputs a password, the display controller 30 searches for a predetermined folder associated with the specified folder ID and also configured with a password matching the input password (S09). If there exists a predetermined folder configured with a password matching the input password (S10, Yes), the display controller 30 causes the display unit to display a list of the image identification information of image data being stored in the predetermined folder configured with that password (S11). On the other hand, if the password does not match (S10, No), information indicating an error is displayed on the display unit (S12).

Subsequently, if the processing in step S06 is being executed (S13, Yes), or in other words, if the third display process is being executed, the process proceeds to step S14. In this case, a back button is displayed on the display unit, and if the user presses the button (S14, Yes), the process proceeds to step S06.

According to the present exemplary embodiment, when multiple predetermined folders associated with the same folder ID are found by search, the multiple predetermined folders are displayed collectively. Consequently, an organized display of folder IDs may be displayed compared to the case of displaying a list without collecting the multiple predetermined folders by folder ID. By using the present exemplary embodiment, the number of user operations performed to select desired image data may be reduced.

In the first display process, the image identification information of image data being stored in the multiple predetermined folders is displayed. Consequently, the number of user operations performed to select image data may be reduced compared to a case in which the folder IDs of multiple predetermined folders are displayed in a list, and the user selects a desired folder ID from the list, and additionally selects desired image data from within the selected predetermined folder.

In the second display process, the image identification information of image data being stored in one or more predetermined folders with associated attribute information that matches attribute information input by the user is displayed. Consequently, the number of user operations performed to display the image identification information of image data being stored in a desired predetermined folder may be reduced compared to a case in which the folder IDs of multiple predetermined folders are displayed in a list, and the user specifies individual folder IDs and individually inputs passwords. In addition, by using attribute information, a predetermined folder of a specific user is specified. For example, by using a password as the attribute information, the user's own predetermined folder is specified.

In the third display process, the image identification information of image data being stored in one or more predetermined folders without associated attribute information is displayed. Consequently, an effect similar to the first display process is obtained. In addition, the image identification information of image data being stored in one or more predetermined folders with associated attribute information that matches attribute information input by the user is displayed. Consequently, an effect similar to the second display process is obtained.

According to the present exemplary embodiment, the usability of the image forming device 10 may improve as the number of predetermined folders increases.

(Modification 1)

Next, Modification 1 (another example of the second display process) will be described with reference to FIGS. 15 and 16. In the example illustrated in FIGS. 9, 10, and 11, a password is configured as attribute information for multiple predetermined folders associated with the same folder ID. Modification 1 differs in that color information is associated as attribute information for multiple predetermined folders associated with the same folder ID.

Figure 15:
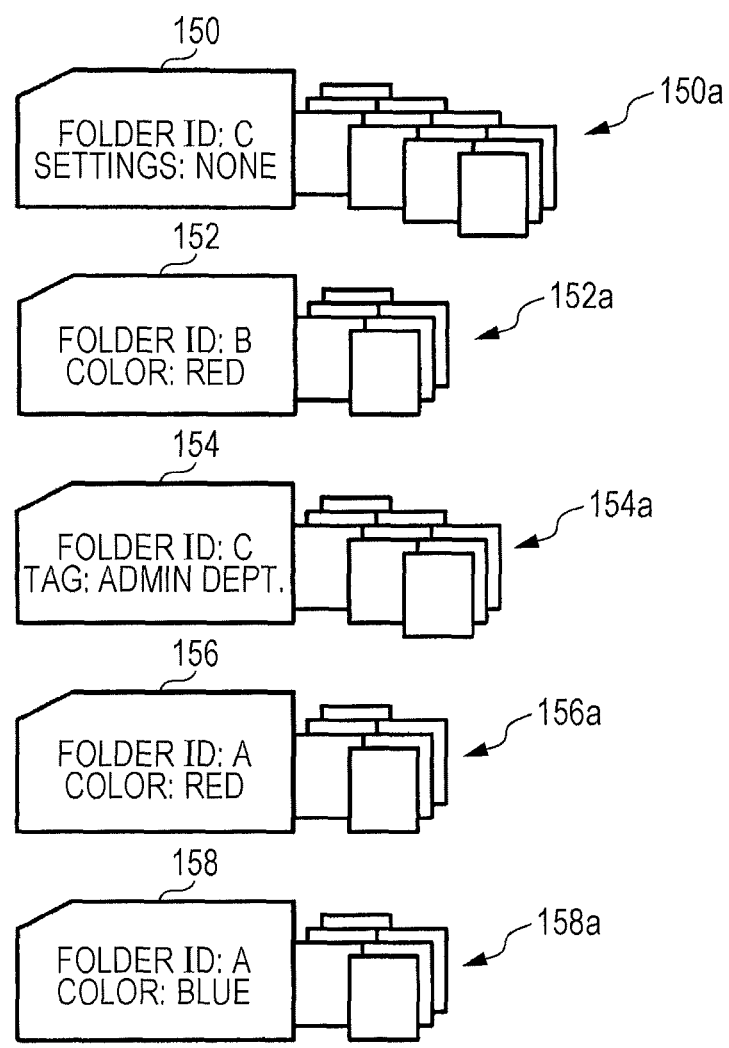
FIG. 15 is a diagram illustrating an example of predetermined folders.

FIG. 15 illustrates an example of predetermined folders. As an example, suppose that five predetermined folders (predetermined folders 150 to 158) are provided.

The folder ID of the predetermined folder 150 is "C", and no attribute information is associated with the predetermined folder 150. The folder ID of the predetermined folder 152 is "B", and color information is associated with the predetermined folder 152 as attribute information. Specifically, color information indicating "red" is associated with the predetermined folder 152. The folder ID of the predetermined folder 154 is "C", and a tag is associated with the predetermined folder 154 as attribute information. Specifically, a tag indicating "Admin Dept." is associated with the predetermined folder 154. The folder ID of the predetermined folder 156 is "A", and color information is associated with the predetermined folder 156 as attribute information. Specifically, color information indicating "red" is associated with the predetermined folder 156. The folder ID of the predetermined folder 158 is "A", and color information is associated with the predetermined folder 158 as attribute information. Specifically, color information indicating "blue" is associated with the predetermined folder 158.

An image data group 150*a* is being stored in the predetermined folder 150. An image data group 152*a* is being stored in the predetermined folder 152. An image data group 154*a* is being stored in the predetermined folder 154. An image data group 156*a* is being stored in the predetermined folder 156. An image data group 158*a* is being stored in the predetermined folder 158. These image data groups are data stored according to instructions from the same or different users.

If the user uses the UI unit 22 of an image forming device 10 to issue a search instruction, the search processor 28 searches all of the predetermined folders 150 to 158, and acquires all folder IDs. If attribute information is associated with a predetermined folder, the search processor 28 acquires the attribute information. In addition, the search processor 28 acquires the image identification information of image data being stored in each of the predetermined folders 150 to 158.

The display controller 30 causes the display unit of the UI unit 22 to display the acquired folder IDs. At this point, the display controller 30 causes the display unit to display representational information that collectively represents the predetermined folders 156 and 158 assigned with the same folder ID "A". Also, the display controller 30 causes the display unit to display representational information that collectively represents the predetermined folders 150 and 154 assigned with the same folder ID "C".

Figure 16A:
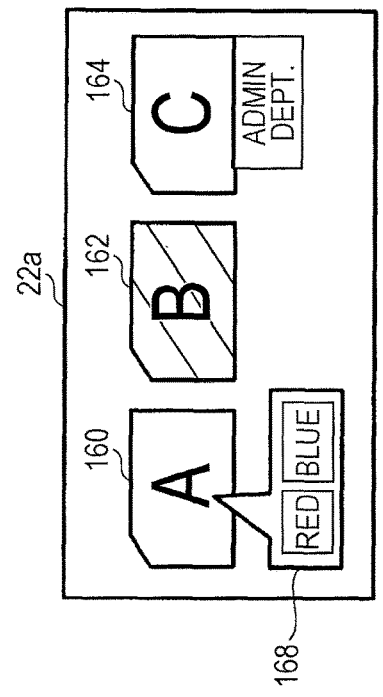
FIGS. 16A to 16C are diagrams illustrating an example of a screen on a display unit.

FIG. 16A illustrates an example display of folder IDs. Graphic objects 160, 162, and 164 are displayed on the screen 22a of the display unit. The graphic object 160 is information representing the folder ID "A". The graphic object 162 is information representing the folder ID "B". The graphic object 164 is information representing the folder ID "C".

The graphic object 160 corresponds to representational information that collectively represents the predetermined folders 156 and 158. The same folder ID "A" is associated with the predetermined folders 156 and 158. In addition, the attribute information associated with the predetermined folders 156 and 158 is color information, and thus the type of attribute information is the same. Consequently, the graphic object 160 corresponds to information that collectively represents the multiple predetermined folders (predetermined folders 156 and 158) associated with the same folder ID and the same type of attribute information. Since multiple predetermined folders with associated color information are collectively displayed, folder IDs are displayed in an organized state compared to the case of displaying a list without collecting these folder IDs. Note that the graphic object 162 represents the folder ID "B" itself of the predetermined folder 152. The graphic object 164 corresponds to representational information that collectively represents the predetermined folders 150 and 154 associated with the same folder ID "C".

Note that the predetermined folder 152 is the only predetermined folder with the folder ID "B", and color information is associated with the predetermined folder 152 as attribute information. Since the color is "red", the display controller 30 displays the graphic object 162 indicating the folder ID "B" in red.

Figure 16B:
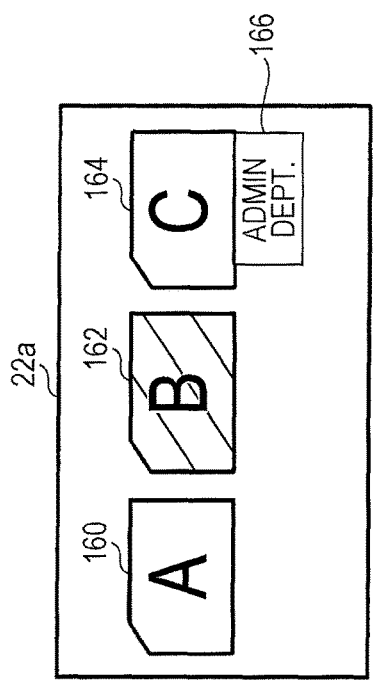

For example, suppose that the user uses the UI unit 22 to specify the graphic object 160 (folder ID "A"). As illustrated in FIG. 15, color information is associated as attribute information with all of the predetermined folders associated with the folder ID "A" (predetermined folders 156 and 158). In other words, among the predetermined folders 156 and 158, there exist only predetermined folders with associated color information. In this case, the display controller 30 executes the second display process. Specifically, as illustrated in FIG. 16B, the display controller 30 causes the display unit to display a color information specification field 166. The specification field 166 is superimposed onto or displayed near the graphic object 160, for example. In the specification field 166, the color information actually assigned as attribute information is displayed, for example. In the example illustrated in FIG. 15, the colors of the predetermined folders 156 and 158 with the folder ID "A" are "red" and "blue". Consequently, information for specifying "red" and "blue" is displayed in the specification field 166. Note that color information may also not be displayed in the specification field 166, and the user may input color information with text or the like.

If the user uses the UI unit 22 to specify a color, the display controller 30 specifies the predetermined folder associated with the specified color, and causes the display unit to display the image identification information of image data being stored in the relevant predetermined folder. For example, if the user specifies "red", the display controller 30 specifies the predetermined folder associated with the folder ID "A" and also set with "red" as color information. In the example illustrated in FIG. 15, the predetermined folder 156 is specified. The display controller 30 causes the display unit to display the image identification information of the image data group 156a being stored in the predetermined folder 156.

Figure 16C:
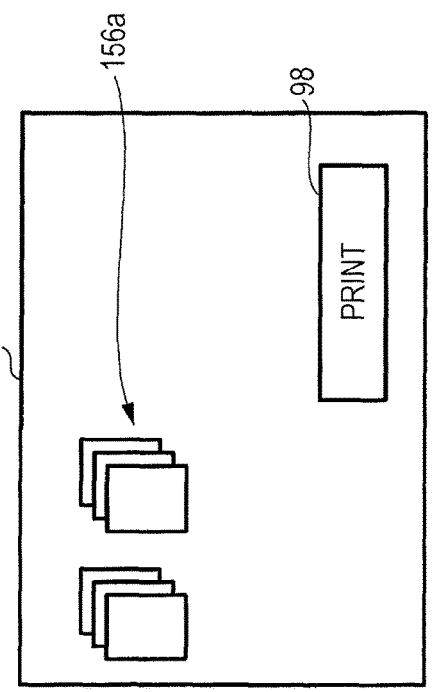

FIG. 16C illustrates an example display of image identification information. On the screen 22a, the image identification information of the image data group 156a being stored in the predetermined folder 156 is displayed in a list. If the user specifies image identification information from the list and presses the print button 98, the image data corresponding to that image identification information is acquired and printed.

(Modification 2)

Modification 2 (yet another example of the second display process) will now be described with reference to FIG. 17. In the example illustrated in FIG. 17, tags are associated as attribute information with multiple predetermined folders associated with the same folder ID.

Figure 17A:
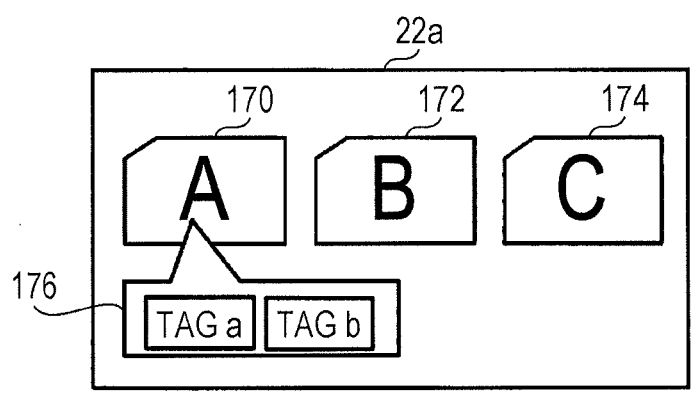
FIGS. 17A and 17B are diagrams illustrating an example of a screen on a display unit.

FIG. 17A illustrates folder IDs acquired by the search processor 28. As an example, suppose that a search returns multiple predetermined folders associated with a folder ID "A", one predetermined folder associated with a folder ID "B", and one predetermined folder associated with a folder ID "C".

The graphic object 170 corresponds to representational information that collectively represents the multiple predetermined folders associated with the folder ID "A". In addition, suppose that tags are associated as attribute information with all of the multiple predetermined folders. Consequently, the graphic object 170 corresponds to information that collectively represents the multiple predetermined folders associated with the same folder ID and the same type of attribute information. Since multiple predetermined folders with associated tags are collectively displayed, folder IDs are displayed in an organized state compared to the case of displaying a list without collecting these folder IDs. Note that the graphic object 172 is information representing the folder ID "B". The graphic object 174 is information representing the folder ID "C".

Figure 17B:
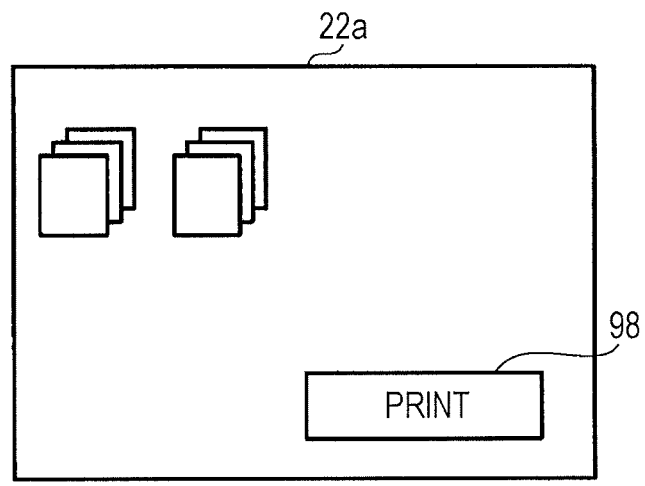

For example, suppose that the user uses the UI unit 22 to specify the graphic object 170 (folder ID "A"). As above, tags are associated with all of the multiple predetermined folders associated with the folder ID "A". In this case, the display controller 30 executes the second display process. Specifically, as illustrated in FIG. 17B, the display controller 30 causes the display unit to display a tag specification field 176. In the specification field 176, the tags actually assigned as attribute information are displayed, for example. In the example illustrated in FIG. 17A, "Tag a" and "Tag b" are displayed. As a specific example, suppose that department names such as "Admin Dept." and "Sales Dept.", dates, or the like are used as the tags. Note that tags may also not be displayed in the specification field 176, and the user may input a tag with text or the like.

If the user uses the UI unit 22 to specify a tag, the display controller 30 specifies the predetermined folder associated with the specified tag, and causes the display unit to display the image identification information of image data being stored in the relevant predetermined folder. For example, if the user specifies "Tag a", the display controller 30 specifies the predetermined folder associated with the folder ID "A" and also having "Tag a" associated as a tag. The display controller 30 causes the display unit to display the image identification information of the image data group being stored in that predetermined folder. FIG. 17B illustrates an example display of image identification information. If the user specifies image identification information from the list and presses the print button 98, the image data corresponding to that image identification information is acquired and printed.

(Modification 3)

Modification 3 (yet another example of the second display process) will now be described with reference to FIG. 18. In the example illustrated in FIG. 18, suppose that any one of a password, color information, and a tag is associated as attribute information with multiple predetermined folders associated with the same folder ID.

Figure 18A:
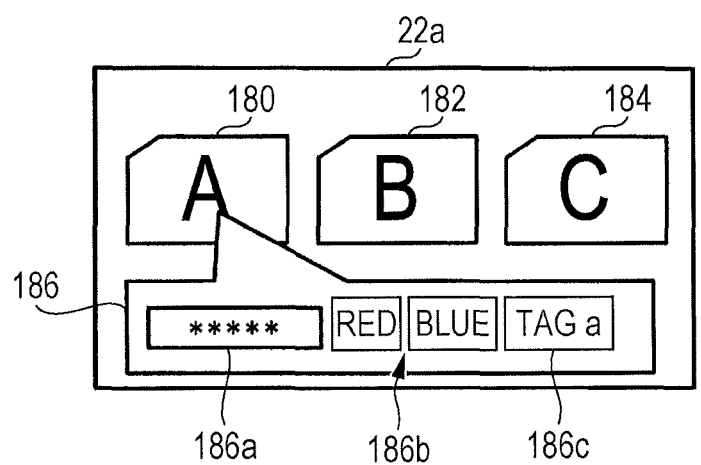
FIGS. 18A and 18B are diagrams illustrating an example of a screen on a display unit.

FIG. 18A illustrates folder IDs acquired by the search processor 28. As an example, suppose that a search returns multiple predetermined folders associated with a folder ID "A", one predetermined folder associated with a folder ID "B", and one predetermined folder associated with a folder ID "C".

The graphic object 180 corresponds to representational information that represents the multiple predetermined folders associated with the folder ID "A". In addition, suppose that attribute information (any one of a password, color information, and a tag) is associated with all of the multiple predetermined folders. Since multiple predetermined folders with some type of attribute information are collectively displayed, folder IDs are displayed in an organized state compared to the case of displaying a list without collecting these folder IDs. Note that the graphic object 182 is information representing the folder ID "B". The graphic object 184 is information representing the folder ID "C".

For example, suppose that the user uses the UI unit 22 to specify the graphic object 180 (folder ID "A"). As above, attribute information is associated with all of the multiple predetermined folders associated with the folder ID "A". In this case, the display controller 30 executes the second display process. Specifically, as illustrated in FIG. 18A, the display controller 30 causes the display unit to display an attribute information specification field 186. The specification field 186 includes a password input field 186a, a color information specification field 186b, and a tag specification field 186c, for example. For example, color information and tags actually assigned as attribute information are displayed inside the specification field 186, and specified by the user. Note that color information and tags may also not be displayed in the specification field 186, and the user may input color information and tags with text or the like.

For example, if the user inputs a password, the display controller 30 specifies the predetermined folder set with a password matching the input password, and causes the display unit to display the image identification information of image data being stored in the relevant predetermined folder. To describe using a specific example, if the user inputs the password "12345", the display controller 30 specifies the predetermined folder associated with the folder ID "A" and also set with the password "12345". The display controller 30 causes the display unit to display the image identification information of the image data group being stored in that predetermined folder.

In addition, if the user specifies a color, the display controller 30 specifies the predetermined folder associated with the specified color, and causes the display unit to display the image identification information of image data being stored in the relevant predetermined folder. To describe using a specific example, if the user specifies "red", the display controller 30 specifies the predetermined folder associated with the folder ID "A" and also set with "red" as color information. The display controller 30 causes the display unit to display the image identification information of the image data group being stored in that predetermined folder.

In addition, if the user specifies a tag, the display controller 30 specifies the predetermined folder associated with the specified tag, and causes the display unit to display the image identification information of image data being stored in the relevant predetermined folder. To describe using a specific example, if the user specifies "Tag a", the display controller 30 specifies the predetermined folder associated with the folder ID "A" and also having "Tag a" associated as a tag. The display controller 30 causes the display unit to display a list of the image identification information of the image data group being stored in that predetermined folder.

Figure 18B:
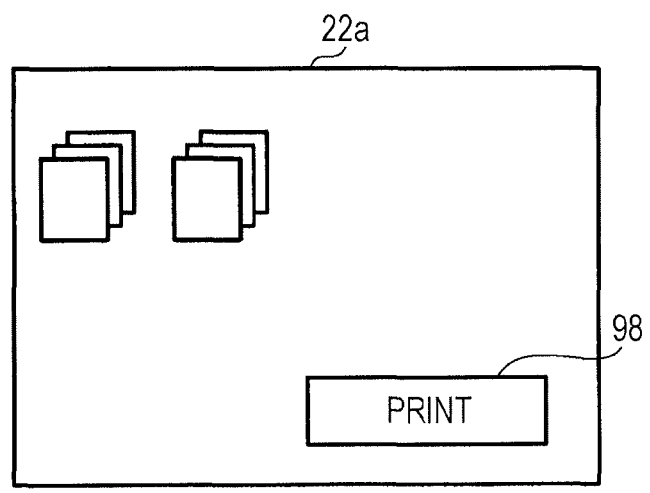

FIG. 18B illustrates an example display of image identification information. If the user specifies image identification information from the list and presses the print button 98, the image data corresponding to that image identification information is acquired and printed.

Note that multiple types of attribute information may also be assigned to a predetermined folder. In this case, if the user inputs or specifies multiple types of attribute information, the display controller 30 specifies the predetermined folder associated with the multiple types of attribute information that were input or specified. Subsequently, the display controller 30 causes the display unit to display the image identification information of the image data group being stored in that predetermined folder. The above will be described using the example illustrated in FIG. 18A. For example, suppose that the multiple predetermined folders associated with the folder ID "A" include a predetermined folder set with a password and a color as attribute information. If the user inputs a password and specifies a color, the display controller 30 specifies the predetermined folder configured with a password matching the input password, and also configured with the specified color. Subsequently, the display controller 30 causes the display unit to display the image identification information of image data being stored in that predetermined folder. Besides the above, a similar process is also conducted when a tag is set. A similar process is also conducted when three or more types of attribute information are assigned to a predetermined folder.

(Modification 4)

Modification 4 (yet another example of the second display process) will now be described with reference to FIG. 19. In the example illustrated in FIG. 19, color information is associated as attribute information with multiple predetermined folders associated with the same folder ID. In Modification 4, the display controller 30 causes the display unit to display representational information that collectively represents the multiple predetermined folders associated with the same folder ID and the same color information.

FIG. 19A illustrates folder IDs acquired by the search processor 28. As an example, suppose that a search returns multiple predetermined folders associated with a folder ID "A", one predetermined folder associated with a folder ID "B", and one predetermined folder associated with a folder ID "C".

The graphic object 190 corresponds to representational information that represents the multiple predetermined folders associated with the folder ID "A". Suppose that color information is associated as attribute information with all of the multiple predetermined folders. For example, color information indicating "red" is associated with all of the multiple predetermined folders. Consequently, the graphic object 190 corresponds to information that collectively represents the multiple predetermined folders associated with the same folder ID and the same attribute information (color information indicating "red"). Since multiple predetermined folders associated with the same color (red) are collectively displayed, folder IDs are displayed in an organized state compared to the case of displaying a list without collecting these folder IDs.

The graphic object 192 corresponds to representational information that represents the multiple predetermined folders associated with the folder ID "A". Suppose that color information is associated as attribute information with all of the multiple predetermined folders. For example, color information indicating "blue" is associated with all of the multiple predetermined folders. Consequently, the graphic object 192 corresponds to information that collectively represents the multiple predetermined folders associated with the same folder ID and the same attribute information (color information indicating "blue"). Since multiple predetermined folders associated with the same color (blue) are collectively displayed, folder IDs are displayed in an organized state compared to the case of displaying a list without collecting these folder IDs.

As above, multiple predetermined folders configured with the same color "red" are categorized into the same group, while predetermined folders configured with the different color "blue" are categorized into a separate group.

The graphic object 194 is information representing the folder ID "B". The graphic object 196 is information representing the folder ID "C".

For example, suppose that the user uses the UI unit 22 to specify the graphic object 190 (folder ID "A" and "red"). In this case, the display controller 30 executes the second display process. Specifically, the display controller 30 specifies the predetermined folder associated with the folder ID "A" and also set with "red" as color information. The display controller 30 causes the display unit to display the image identification information of image data being stored in that predetermined folder.

Figure 19:
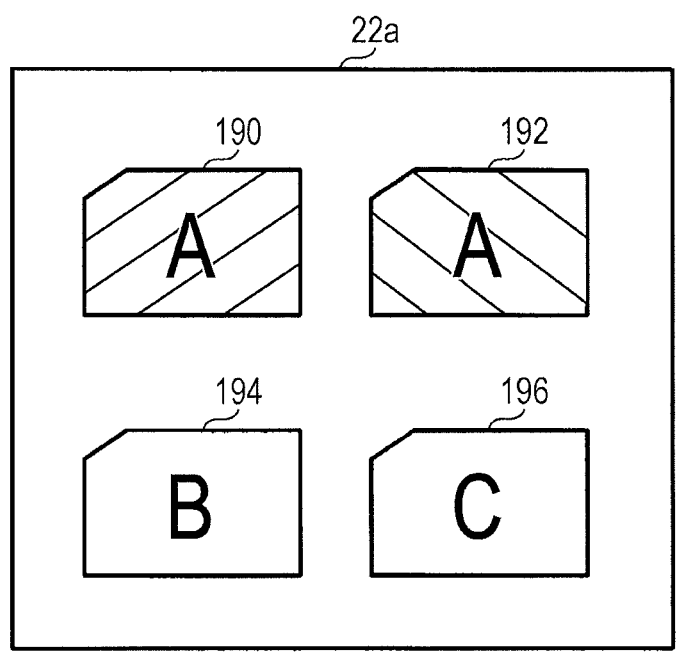
FIG. 19 is a diagram illustrating an example of a screen on a display unit.

Note that although the example illustrated in FIG. 19 is described using color information as an example, a similar process may also be conducted when a tag is assigned as the attribute information. In other words, multiple predetermined folders configured with a tag of the same content are categorized into the same group, while predetermined folders configured with a tag of different content are categorized into a separate group.

(Modification 5)

Modification 5 (another example of the third display process) will now be described with reference to FIG. 20. In the example illustrated in FIGS. 12 and 13, a password is configured as attribute information for multiple predetermined folders associated with the same folder ID. Modification 5 differs in that, among the multiple predetermined folders associated with the same folder ID, there exists a mixture of predetermined folders having color information associated as attribute information (predetermined folders with attribute information) and predetermined folders not having associated attribute information (predetermined folders without attribute information).

Figure 20A:
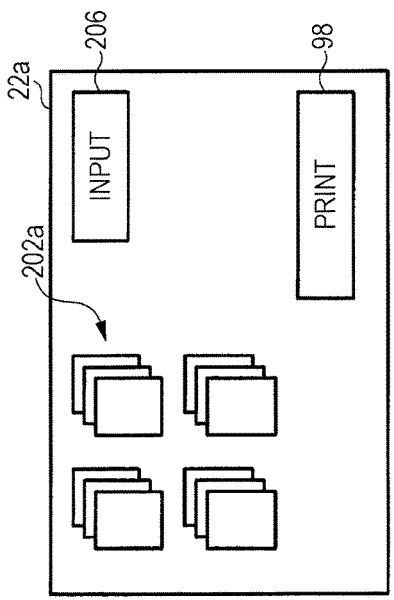
FIGS. 20A to 20D are diagrams illustrating an example of a screen on a display unit.

FIG. 20A illustrates folder IDs acquired by the search processor 28. As an example, suppose that a search returns multiple predetermined folders associated with a folder ID "A", one predetermined folder associated with a folder ID "B", and one predetermined folder associated with a folder ID "C".

The graphic object 200 corresponds to representational information that collectively represents the multiple predetermined folders associated with the folder ID "A". The graphic object 202 is information representing the folder ID "B". The graphic object 204 is information representing the folder ID "C".

As an example, suppose that among the multiple predetermined folders associated with the folder ID "A", there exists a mixture of two predetermined folders with attribute information, and a predetermined folder without attribute information. One of the predetermined folders with attribute information has associated color information indicating "red". The other predetermined folder with attribute information has associated attribute information indicating "blue".

Figure 20B:
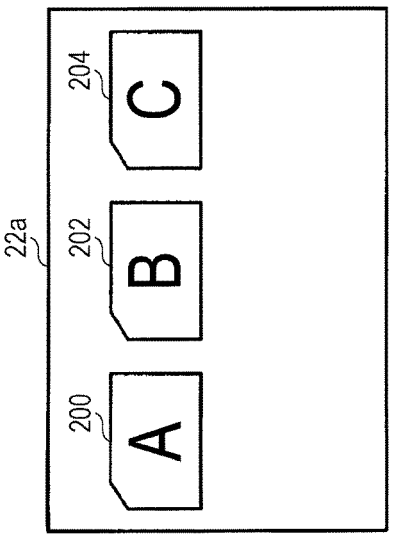

For example, suppose that the user uses the UI unit 22 to specify the graphic object 200 (folder ID "A"). As above, among the multiple predetermined folders associated with the folder ID "A", there exists a mixture of predetermined folders with attribute information, and a predetermined folder without attribute information. In this case, the display controller 30 executes the third display process. Specifically, as illustrated in FIG. 20B, the display controller 30 causes the display unit to display a list of the image identification information of the image data group 202a being stored in the predetermined folder without attribute information. In addition, the display controller 30 causes the display unit to display an instruction button 206 that causes a color information specification field to be displayed. At this stage, if the user specifies image identification information from the list and presses the print button 98, the image data corresponding to that image identification information is acquired and printed.

Figure 20C:
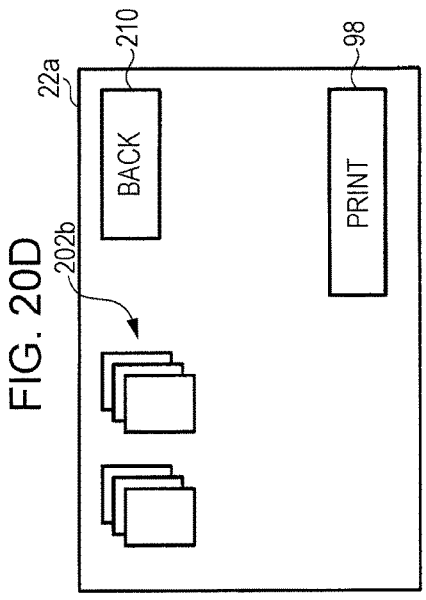

If the user presses the instruction button 206, as illustrated in FIG. 20C, the display controller 30 causes the display unit to display a color information specification field 208. In the specification field 208, the color information actually associated as attribute information is displayed, for example. Herein, since "red" and "blue" are specified as the color information, information for specifying "red" and "blue" is displayed in the specification field 208. Note that color information may also not be displayed in the specification field 208, and the user may input color information with text or the like.

Figure 20D:
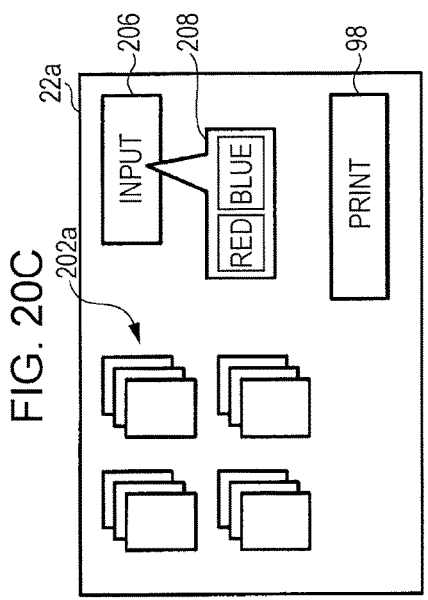

If the user specifies a color, the display controller 30 specifies the predetermined folder set with the specified color, and causes the display unit to display the image identification information of image data being stored in the relevant predetermined folder. For example, if the user specifies "red", the display controller 30 specifies the predetermined folder associated with the folder ID "A" and also set with "red" as color information. Subsequently, as illustrated in FIG. 20D, the display controller 30 causes the display unit to display a list of the image identification information of the image data group 202b being stored in that predetermined folder. If the user specifies image identification information from the list and presses the print button 98, the image data corresponding to that image identification information is acquired and printed.

Note that, a back button 210 is displayed on the screen 22a. If the user presses the back button 210, the display controller 30 causes the display unit to display the previous screen. For example, the display controller 30 causes the display unit to display the image identification information of the image data group 202a, as illustrated in FIG. 20B.

In Modification 5, color information is used as the attribute information, but a similar process is also executed when a tag is used. In this case, tags that are actually associated as attribute information are displayed in the specification field 208. If a tag is specified in the specification field 208, the predetermined folder associated with the specified tag is specified, and the image identification information of image data being stored in the relevant predetermined folder is displayed. In addition, Modification 3 may also be applied to Modification 5. In this case, a similar process is likewise executed. In this case, information corresponding to the actually associated attribute information is displayed in the specification field 208. For example, if a password, color information, and tags are used, a password input field, a color specification field, and a tag specification field are displayed in the specification field 208. Subsequently, if the user inputs or specifies attribute information, the predetermined folder associated with that attribute information is specified, and the image identification information of image data being stored in the relevant predetermined folder is displayed.

(Other Examples)

As another example, when multiple predetermined folders are found for which at least one of the folder ID, attribute information, and type of attribute information is the same, the display controller 30 may collectively display the relevant predetermined folders.

For example, when multiple predetermined folders with mutually different folder IDs but the same attribute information are found, the display controller 30 may cause the display unit to display representational information that collectively represents the multiple predetermined folders. Specifically, the use of color information or a tag as attribute information is anticipated. For example, when multiple predetermined folders with mutually different folder IDs but set with the same color are found, the display controller 30 causes the display unit to display representational information that collectively represents the multiple predetermined folders. If the user specifies the representational information, the display controller 30 causes the display unit to display the image identification information of image data being stored in the multiple predetermined folders. A similar process is also conducted when a tag is used as the attribute information. When such a process is executed, the folder IDs are likewise displayed in an organized state.

In addition, when multiple predetermined folders with mutually different folder IDs and attribute information but the same type of attribute information are found, the display controller 30 may collectively display the multiple predetermined folders. Specifically, the use of a password as attribute information is anticipated. When multiple predetermined folders set with a password are found, but the folder IDs and passwords are mutually different, the display controller 30 causes the display unit to display representational information that collectively represents the multiple predetermined folders. If the user specifies the representational information, the display controller 30 causes the display unit to display a password input field. When the user inputs a password, the display controller 30 specifies a predetermined folder set with a password matching the input password, and causes the display unit to display the image identification information of image data being stored in the relevant predetermined folder. When such a process is executed, the folder IDs are likewise displayed in an organized state.

The above image forming device 10 is realized by the cooperative action of hardware resources and software as an example. Specifically, the image forming device 10 is equipped with a processor such as a CPU (not illustrated). By having the processor load and execute a program stored in a storage device (not illustrated), the functions of the respective components of the image forming device 10 are realized. The program is stored in the storage device via a recording medium such as a CD or DVD, or alternatively, via a communication link such as a network. Alternatively, the components of the image forming device 10 may also be realized by hardware resources such as a processor or an electronic circuit, for example. A device such as memory may also be used in such a realization. As another example, the components of the image forming device 10 may also be realized by a digital signal processor (DSP), a field-programmable gate array (FPGA), or the like.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming device comprising:
   a search processor that searches storage location information corresponding to storage locations storing image data; and
   a display controller that, when a plurality of storage location information with the same identification information is found by search, causes a display unit to display representational information collectively representing the plurality of storage location information, instead of the plurality of storage location information, wherein
   the plurality of storage location information is associated with respective attribute information, at least one of the respective attribute information including a password,
   the display controller executes different processes of displaying the image data, the different processes including a first process of displaying the image data, a second process of displaying the image data, and a third process of displaying the image data, the different processes being executed based on whether the attribute information is associated with the plurality of storage location information, and displaying of the image data is different for at least the first process and the second process,
   when the attribute information is not associated with any of the plurality of storage location information corresponding to specified representational information, the display controller causes the first process to be executed, the first process including causing the display unit to display the image data stored in a storage location corresponding to storage location information, of the plurality of storage location information,
   when the attribute information is associated with all of the plurality of storage location information, the display controller causes the second process to be executed, the second process including:
   (i) causing the display unit to display an input field, and
   (ii) when a user selects, via an input device, the representational information that represents the plurality of storage location information, causing the display unit to display image data stored in a storage location corresponding to storage location information, of the plurality of storage location information, when a password input by the user via the input field matches a password associated with the storage location information, when the attribute information is associated with some of the plurality of storage location information, the display controller causes the third process to be executed, the third process including causing the first process to be executed for the storage location information without associated attribute information, and causing the second process to be executed for the storage location information with associated attribute information, and the image data is printed on a print medium.

2. The image forming device according to claim 1, wherein when the plurality of storage location information associated with the same identification information and a same type of the attribute information are found by search, the display controller causes the display unit to display the representational information collectively representing the plurality of storage location information.

3. The image forming device according to claim 1, wherein when the plurality of storage location information associated with the same identification information and the same attribute information are found by search, the display controller causes the display unit to display the representational information collectively representing the plurality of storage location information.

4. The image forming device according to claim 1, wherein the identification information is a name of storage location information, and at least one of the attribute information further including color information.

5. The image forming device according to claim 1, wherein the storage location information is provided in the image forming device and in at least one other image forming device, and the search processor searches the storage location information provided in the image forming device and the at least one other image forming device.

6. A non-transitory computer readable medium storing a program causing a computer to execute a process for forming an image, the process for forming the image comprising:

searching storage location information corresponding to storage locations storing image data;

when a plurality of storage location information with the same identification information is found by search, causing a display unit to display representational information collectively representing the plurality of storage location information, instead of the plurality of storage location information;

associating the plurality of storage location information with respective attribute information, at least one of the respective attribute information including a password;

executing different processes of displaying the image data, the different processes including a first process of displaying the image data, a second process of displaying the image data, and a third process of displaying the image data, the different processes being executed based on whether the attribute information is associated with the plurality of storage location information, and displaying of the image data is different for at least the first process and the second process;

when the attribute information is not associated with any of the plurality of storage location information corresponding to specified representational information, executing the first process, the first process including causing the display unit to display the image data stored in a storage location corresponding to storage location information, of the plurality of storage location information;

when the attribute information is associated with all of the plurality of storage location information, executing the second process, the second process including:
  (i) causing the display unit to display an input field, and
  (ii) when a user selects, via an input device, the representational information that represents the plurality of storage location information, causing the display unit to display image data stored in a storage location corresponding to storage location information, of the plurality of storage location information, when a password input by the user via the input field matches a password associated with the storage location information;

when the attribute information is associated with some of the plurality of storage location information, executing the third process, the third process including causing the first process to be executed for the storage location information without associated attribute information, and causing the second process to be executed for the storage location information with associated attribute information; and printing the image data on a print medium.

7. A non-transitory computer readable medium storing a program causing a computer to execute a process for forming an image, the process for forming the image comprising:

searching storage location information corresponding to storage locations storing image data;

when a plurality of storage location information with the same identification information is found by search, causing a display unit to display representational information collectively representing the plurality of storage location information, instead of the plurality of storage location information, the plurality of storage location information including first storage location information with associated attribute information and second storage location information without any associated attribute information;

associating the plurality of storage location information with respective attribute information, at least one of the respective attribute information including a password;

executing different processes of displaying the image data, the different processes including a first process of displaying the image data, a second process of displaying the image data, and a third process of displaying the image data, the different processes being executed based on whether the attribute information is associated with the plurality of storage location information, and displaying of the image data is different for at least the first process and the second process;

executing the third process, the third process including causing the first process to be executed for the storage location information without associated attribute information, and causing the second process to be executed for the storage location information with associated attribute information, the first process including causing the display unit to display the image data stored in a storage location corresponding to storage location information, of the plurality of storage location information, and the second process including:
- (i) causing the display unit to display image data stored in a second storage location corresponding to the second storage location information and to display an input field, and
- (ii) when a user selects, via an input device, the representational information that represents the plurality of storage location information, causing the display unit to display image data stored in a first storage location corresponding to the first storage location information, when a password input by the user via the input field matches a password associated with the first storage location information; and printing the image data stored in the second storage location and the image data stored in the first storage location on a print medium.

\* \* \* \* \*